(12) United States Patent
Phallen et al.

(10) Patent No.: US 6,186,193 B1
(45) Date of Patent: Feb. 13, 2001

(54) CONTINUOUS LIQUID STREAM DIGITAL BLENDING SYSTEM

(75) Inventors: Iver J. Phallen, Youngstown; Richard J. Jezuit, Jr., Lancaster; Peter B. Millett, Jr., Buffalo, all of NY (US)

(73) Assignee: Oden Corporation, Buffalo, NY (US)

( * ) Notice: Under 35 U.S.C. 154(b), the term of this patent shall be extended for 0 days.

(21) Appl. No.: 09/081,195

(22) Filed: May 19, 1998

Related U.S. Application Data

(63) Continuation-in-part of application No. 08/969,231, filed on Nov. 13, 1997.
(60) Provisional application No. 60/030,973, filed on Nov. 15, 1996.

(51) Int. Cl.[7] ............................................. B65B 3/26
(52) U.S. Cl. ................... 141/83; 141/9; 141/99; 141/100; 141/105; 141/198; 222/63; 222/64; 222/71; 222/134; 222/135; 222/255
(58) Field of Search ................... 141/83, 9, 98, 141/99, 104, 105, 192, 198; 222/56, 61, 63, 64, 71, 129, 132, 134, 135, 255, 638, 639, 642, 644, 1; 364/479.09; 366/179.1

(56) References Cited

U.S. PATENT DOCUMENTS

| | | | |
|---|---|---|---|
| 3,168,872 | * | 2/1965 | Pinkerton ........................ 417/492 |
| 4,341,327 | * | 7/1982 | Zeitz .................................. 222/63 |
| 4,494,676 | * | 1/1985 | Berweger ........................... 222/63 |
| 4,599,239 | | 7/1986 | Wieland et al. . |
| 4,831,885 | | 5/1989 | Dahlin . |
| 5,068,116 | | 11/1991 | Gibney et al. . |
| 5,314,703 | | 5/1994 | Gibney et al. . |
| 5,325,852 | | 7/1994 | Clem . |
| 5,388,761 | * | 2/1995 | Langeman ........................... 239/1 |
| 5,447,369 | * | 9/1995 | Boxall ............................... 366/136 |
| 5,481,986 | | 1/1996 | Clem . |
| 5,537,914 | | 7/1996 | Gibney et al. . |
| 5,552,171 | | 9/1996 | Gibney et al. . |
| 5,656,313 | | 8/1997 | Gibney et al. . |
| 5,803,665 | * | 9/1998 | Stephens ........................... 405/146 |

* cited by examiner

Primary Examiner—David J. Walczak
Assistant Examiner—Peter deVore
(74) Attorney, Agent, or Firm—John C. Thompson

(57) ABSTRACT

The present invention consists of a method and apparatus providing for the continuous stream blending, preferably on a mass ratio basis, of two or more liquids. Each individual liquid stream is synchronously dosed in precise mass ratio to a common mixing point. The flow of each stream is on-off or digital. Repeated mass ratio doses of defined and matching flow interval, referred to as synchronous digital flow, interspersed with a defined interval of no flow, constitutes digital flow at a net rate sufficient to meet or exceed some required take-away of the blended liquids. In one preferred embodiment, each dose stream flow is produced and measured by a four element apparatus preferably consisting of a servo motor and controller, a precision positive displacement pump, a Coriolis mass meter and a precision flow stream shut-off device. The servo motor and controller establish and control a periodic and intermittent flow rate necessary to displace a defined mass dose in a precisely defined flow interval. The flow interval is measured against a precision millisecond digital clock. The Coriolis mass meter is used only to totalize mass flow to define the desired mass dose during the defined digital flow interval. The flow stream shut-off device ensures precise delivery of the mass dose to the common mixing point. The flow rate of a stream is automatically adjusted by the control electronics until the required mass dose is delivered in the defined flow interval.

45 Claims, 11 Drawing Sheets

CONTINUOUS LIQUID STREAM DIGITAL BLENDING SYSTEM

CROSS-REFERENCE TO RELATED APPLICATIONS

The present invention is a continuation-in-part of copending U.S. Patent Application No. 08/969,231, filed Nov.13, 1997, the subject matter of which is incorporated herein by reference thereto, the aforementioned application in turn claiming priority from U.S. Provisional Application No. 60/030,973 filed Nov. 15, 1996.

TECHNICAL FIELD

The present invention relates generally to a method and apparatus for the combining together of two or more liquids to form a batch or blend of desired mixture or proportions. More specifically, the invention relates to the use of intermittently operated devices for initiating liquid flow in the form of servo driven rotary positive displacement pumps, flow meters and precision flow shut-off devices to create repeated synchronized doses of two or more liquids to a common location, the string of synchronized intermittent dose cycles creating a desired net flow rate of ratio blended liquids wherein the blended flow from the apparatus can be started and stopped at will without any adverse effect upon the accuracy of the blended proportions of the liquid streams.

BACKGROUND OF THE INVENTION

The combining of two or more liquids together to form a defined mixture of the constituent liquids is fundamental to many industrial processes and commercial products. This combining of liquids may be referred to as batching or blending and is common to many industrial segments including pharmaceutical products, biomedical products, food processing products, household products, personal care products, petroleum products, chemical products and many other general industrial liquid products.

Most typically, liquid products are made by combining relatively large quantities of each constituent. Constituent liquids are held in large tanks and are moved in correct volumetric or weight ratio into another large tank where mixing of the liquids occurs. This general process is referred to as batching.

Liquids batching entails many drawbacks and limitations. For example, large tanks are required and large volume batches are typically prepared. This large scale requires substantial manufacturing space, and large batch volumes dictate a relatively fixed and inflexible manufacturing schedule. Large volumes are typically batched in order to overcome the relative imprecision of constituent liquids measurement. Large volumes help to reduce these errors as a percentage of the total batch quantity. Another drawback of batching is that the batch frequently changes its rheological or chemical properties over time. This aging effect is common to many formulations and over time it forces many adjustments to be made in the packaging machines used to fill the batched liquids into unit of use containers. Batching also can lead to open or partially open tanks and to liquids exposed to the atmosphere. This can lead to unwanted chemical degradation and to microbial contamination.

Batching can also lead to difficulties in mixing together the liquid components in large volumes. It is often true that the components can be mixed only with difficulty and require prolonged agitation to become homogeneous. It is also well known that it is common for different levels of a large tank to have different proportionate mixtures of the liquids. It is also true that the large volumes typically committed to batching cause cleaning to be slow, laborious and difficult to automate. Large volumes of cleaning effluents are produced, leading to issues of waste and contamination.

Because of these numerous and substantial shortcomings and limitations, alternative means of liquid products manufacturing have been sought. One alternative method to batching is termed continuous stream blending.

Continuous stream blending embodies the notion of combining constituent liquids to form a liquid product only as needed or on a demand basis. Essentially, product is made only as required and at the rate required. The rate required is typically based on the demand of the liquid filling machine packaging the liquid product.

The appeal and merit of a continuous stream blending system, as distinct from a batching system, is clear. The ability to eliminate large liquid product batch preparation and holding tanks leads to a small system volume, more product compounding flexibility, faster product species turn around, smaller and shorter practical packaging run capabilities and a substantially lower capital asset commitment. Continuous stream blending can also yield superior product formula accuracy and quality, and can eliminate the barrier or "wall" between liquid products processing and liquid products packaging, as well as greatly reduce waste, cleanup time and effluent volumes. Furthermore, mixing is simplified and product aging effects are largely eliminated. The real issue is how to build a continuous stream blending system with the maximum degree of accuracy, flexibility of use, and versatility of application in a broad range of commercial sectors.

Numerous designs for continuous stream blending have been set forth, originating from various liquids processing industries, particularly beverage processing and food processing. These designs have been attempts to develop and market continuous flow proportioning or blending systems based upon ratio flow control using flow meters and proportioning—integrating—derivative (hereinafter—PID) feedback control loops. For example, H & K Inc. of New Berlin, Wis., has introduced "Contimix" based upon this design approach. In general, these designs rely on regulating a continuous flow of the liquid streams using variable orifice valves or speed controlled pumps, where the flow rate signal from a flow meter, most often a Coriolis mass flow meter, is used to proportionately modulate the flow control device in order to attempt to maintain a desired ratio of flows among the streams, and where another signal representing overall system demand rate is used to proportionately modulate the summed flow of the entire system.

Several major design problems are encountered with continuous flow blending systems utilizing this flow architecture. First, as the overall output of the system is increased or decreased, the rate of change capability or response time constant of each stream will vary one from the next. Thus, with a varying output command signal, each stream reacts at a different rate causing loss of ratio flow and this is further aggravated by the overshoot or undershoot of each stream as a new set point is reached. Also, as each stream flow rate changes it can perturb the flow rate of the other stream or streams causing hunting or oscillations. These common control problems can cause serious loss of blended stream accuracy. Clearly, PID loop controllers are designed to "tame" or control complex systems which are not inherently designed for stability or ease of control. They deal with the interacting multiple dependent and independent variables of a flow stream in a non-real time, statistical way and "fight" changing parameters on an historical basis.

Still another problem can arise when a feedback signal change causes the flow to briefly go below or above the permissible range of the flow meter generating the feedback signal. Even with software or hardware safeties this can occur and, as will be discussed fully further on, the requirement to maintain flow through a Coriolis mass flow meter within a defined range to achieve satisfactory accuracy is clearly demonstrable.

Perhaps the major problem encountered with these designs and the PID control architecture arises with the inevitable need to start and stop the flow stream system. When a stop-start event occurs, it is very difficult to bring the system back on-line with balanced (that is to say accurate) flow and blending. This problem has been so persistent that nearly all installed systems have resorted to the use of a surge tank of up to several hundred gallons capacity to allow blending flow to continue during brief filler machine stoppages.

Even with the use of a surge tank, if blending flow must stop because of a prolonged filler stoppage, upon re-start the flow streams must either be diverted until correct flow rates are reestablished, or the surge tank must be quite large to allow poorly matched flow ratios to be statistically "diluted" to prevent loss of accurate blending. Either method results in substantial waste, decreased blending accuracy, increased system complexity and increased system volume, thus depleting the sought after advantages of continuous stream blending.

Another major problem encountered with PID control designs occurs when blending flow rates must be altered to adjust for variable take-away demand. When this occurs, the system is "perturbed" and the flow rates of each feed stream must be slewed or varied. This can occur at only a finite and limited rate, and the rate of change in flow rarely matches on each flow stream. The result of these inherent limitations is a lag in response to flow rate change commands, unbalance in flows during change, and overshoot of the new flow set point. These phenomenon are inherent to PID based schemes and limit the overall performance of such systems.

While it is possible to "tune" PID controls in order to minimize dynamic control limitations and inaccuracies, in a continuous stream blending system designed to operate as a general purpose device across a wide range of blend formulas, liquid properties and flow rates, a PID loop control scheme cannot be readily optimized.

The prior art discloses several examples of designs which use Coriolis mass meters to control liquid blending for various particular purposes.

Clem, 5,325,852, discloses a means of combining a liquid and a gas in order to alter the density of the liquid. The liquid density and mass flow are established using a Coriolis mass meter, while the flow rate of the gas is regulated by a thermal dispersion type gas mass flow meter. Analog signals from the flow meters are used for control purposes. This patent does not disclose method or apparatus for combining continuously flowing multiple liquid streams on a mass ratio basis.

Clem, 5,481,968, discloses a means and apparatus to adjust the densities of liquid feed streams using Coriolis mass meters as densitometers, and provides for combining streams of liquids to achieve a desired final density. Mass meters control stream flow rates via a PLC feedback loop to proportionately control an adjustable speed pump drive for the purpose of adding one stream to another stream.

In 5,656,313, Gibney et al. disclose a beverage syrup blending apparatus in which the mass flow of a liquid component is determined by a Coriolis mass flow meter, the mass flow converted by formula into a volumetric flow, the volumetric flow signal then being used to proportionately control the ratio of flow of two liquids, control being by adjustment of a variable orifice liquid flow control valve.

In a commercial publication issued by H & K Inc., New Berlin, Wis., there is disclosed a continuous blending system named Contimix. The document describes a multiple liquid stream apparatus in which Coriolis mass meters proportionately control the continuous flow rate of the streams to formula defined mass ratios. The liquid streams combine into a common manifold.

OBJECTS AND SUMMARY OF THE INVENTION

It is a primary object of the present invention to overcome the numerous disadvantages, as set forth above, of presently known continuous stream liquid blending methods.

More particularly, the primary objects of the present invention include:

1. To disclose a unique and novel continuous flow liquids blending method and apparatus wherein the flow through the apparatus is intermittent but the flow output from the apparatus is available on a continuous stream basis.

2. To disclose a unique and novel method for combining two or more liquid streams on a mass ratio basis using synchronized intermittent flow of the streams, herein interchangeably termed digital flow or digital flow streams, digital blending, digital batching, digital dosing; the method particularly allowing the apparatus to stop and start at frequent intervals without any accuracy or other performance penalty.

3. To disclose a unique and novel method for establishing synchronous flow of two or more liquid streams by measurement of digital flow duration against a precision clock signal.

4. To disclose a unique and novel means to maintain synchronous digital flow of two or more liquid streams by measuring and adjusting the digital flow duration of each stream against a common precision clock with each digital cycle of the apparatus.

5. To disclose a unique and novel method of accommodating a change in the density of a constituent liquid stream wherein the Coriolis mass meter delivers the correct digital flow mass increment to maintain the correct mass ratio, but the flow rate is altered up or down in order to maintain synchronous flow rates of each stream, such alteration being computed and implemented in the interval between digital dose cycles by adjustment in the pump drive servo motor velocity setting.

6. To disclose a unique and novel method of providing a continuous stream blending apparatus where digital flow allows the mass dose accuracy and synchrony of flow to be monitored and adjusted with each digital flow cycle.

7. To disclose a unique and novel continuous liquid stream digital blending method wherein the mass dose delivered by each stream is based directly on a mass ratio formula for the finished liquid stream rather than on density alteration or adjustment of constituent flow streams or density alteration or adjustment of the combined stream.

8. To disclose a unique and novel continuous liquid stream digital blending apparatus wherein, because its operation is based only upon a mass ratio formula, a Coriolis mass meter sampling the density of the finished liquid stream can be directly used to independently check the accuracy with which the final product has been blended.

9. To disclose a unique and novel continuous liquid stream digital blending apparatus in which the method of final continuous stream flow rate control can be on-off modulation or digital flow rate control, or any desired analog modulation of flow rate from zero to the maximum of the particular apparatus, any such modulation having no effect on the digital dosing method used to produce the blended product, save its on-off status.

10. To disclose a unique and novel continuous liquid stream digital blending method wherein a particular final continuous stream mass flow rate can be satisfied by operating each dose stream apparatus on an intermittent or digital mass flow basis with each mass flow rate being increased by a common factor adequate to produce net flow equal to or greater than the continuous stream take-away requirement.

11. To disclose a unique and novel continuous liquid stream digital blending apparatus wherein each dosing stream apparatus typically consists of a servo drive and associated controller, a rotary positive displacement pump, a Coriolis mass flow meter and a positive shut-off dose stream injector, the particular details and arrangements of which are set forth and disclosed in co-pending application 08/969,231, entitled "A Net Mass Liquid Filler", this application being incorporated by reference into this disclosure.

12. To disclose a unique and novel continuous liquid stream digital blending apparatus which is self-contained and can be used with flow dose streams synchronously combined as a blending system or, without substantial change or alteration, as a matched digital flows batching system where flow streams are not directly combined but are simultaneously directed to a common tank or vessel.

13. To disclose a unique and novel continuous liquid stream digital blending apparatus in which each dose stream contains a Coriolis mass meter and the mass meter serves only as a dose totalizer and not as a flow rate feedback device and in which the mass flow total is determined by a variable frequency digital output from the mass meter.

14. To disclose a unique and novel continuous liquid stream digital blending apparatus wherein the flow rate at which each digital dose flows through the Coriolis mass meter and is delivered from each flow stream apparatus is regulated to prevent variance during the period of mass dosing by a servo motor mounted digital encoder feedback signal connected directly to the dosing pump servo drive control electronics.

15. To disclose a unique and novel continuous liquid stream digital blending apparatus in which the use of a positive shut-off injector nozzle located at the point of common dosing of each digital flow stream assures high precision, accuracy and repeatability of mass dose, and prevents any back flow or mixing of other liquid constituents into the individual dose streams.

16. To disclose a unique and novel continuous liquid stream digital blending apparatus in which the primary mixing of the synchronously flowing liquid streams uniquely occurs in a kinetic mixing chamber, each stream being relatively directed to collide with the others by use of the positive shut-off injector nozzles used to terminate the flow of each stream.

17. To disclose a unique and novel continuous liquid stream digital blending apparatus in which secondary mixing of the digital flow streams can occur using a ribbon type in-line static mixing device.

18. To disclose a unique and novel continuous liquid stream digital blending apparatus in which the digital flow streams can be subdivided after kinetic mixing in order to allow flow through several parallel static mixing elements in order to reduce the back pressure on the apparatus flow streams.

19. To disclose a unique and novel continuous liquid stream digital blending apparatus in which the digital flow streams, after kinetic mixing and static ribbon mixing, can be directly filled into a unit of use package or container using a positive shut-off filling nozzle at the point of dispense at the filling machine.

20. To disclose a unique and novel continuous liquid stream digital blending apparatus in which the mass dose of each digital flow stream can be directly collected and measured at the point of injection into the kinetic mix chamber, such collection being by use of a second positive shut-off injector nozzle associated with the stream and for the purpose of calibrating and validating the Coriolis mass meter associated with the stream.

21. To disclose a unique and novel continuous liquid stream digital blending apparatus in which more than one digital dose apparatus may be used to provide the correct mass ratio of a particular constituent liquid to a blend, thus permitting higher absolute total flow rates of the final stream without the use of a larger servo drive, pump and mass meter.

22. To disclose a unique and novel continuous liquid stream digital blending apparatus in which the digital flow method limits any possible error in mass ratio flow increment or rate of a stream to one digital flow cycle because regardless of any change in the flow rate of a stream, it can be out of synchronous flow prior to electronic correction for only the brief period of digital flow, typically five seconds, and regardless of the flow rate change the actual mass ratio quantity will deviate from the prescribed formula or recipe only moderately prior to correction at the next digital flow cycle. Thus, the disclosed method is self-limiting as to the magnitude and nature of blending error.

23. To disclose a unique and novel continuous liquid stream digital blending apparatus in which two redundant alarm methods are used to assure that the mass flow rate through any given Coriolis mass flow meter is established and maintained within the optimum accuracy measuring range of the meter. The first alarm measures the servo motor mounted digital incremental encoder frequency to assure that the flow rate through the flow meter does not fall below or above the meter's optimal range; the second alarm measures the variable frequency mass flow output of the meter to assure that the flow rate through the meter does not fall below or above the meter's optimal range.

24. To disclose a unique and novel continuous liquid stream digital blending apparatus in which each dosing stream apparatus or channel is modular and in which a series of units, with overlapping flow capabilities, provide a range of mass ratio capabilities suitable for use with a broad range of liquids products recipes.

25. To disclose a unique and novel continuous liquid stream digital blending method in which the same dosing stream apparatus can be capable of operating with liquids ranging from very low viscosity (water-like) to very high viscosity (non free-flowing).

26. To disclose a unique and novel continuous liquid stream digital blending method in which the ability to clean the apparatus in place, and substantially without manual disassembly, is provided for both in the mechanical design of the apparatus and in the control electronics.

27. To disclose a unique and novel continuous liquid stream digital blending method in which the blended liquid is displaced into a final blend container and in which the capacity of the final blend container can be as small as the equivalent of two digital mass dose cycles of the constituent stream channels.

28. To disclose a unique and novel continuous liquid stream digital blending method in which computational algorithms are used by the apparatus control electronics to automatically establish the mass dose required of each flow channel based upon a liquids product mass ratio formula and to automatically establish the mass dose flow in the defined synchronous flow time.

29. To disclose a unique and novel continuous liquid stream digital blending apparatus in which digital mass flow into the final blend tank is started and stopped by a liquid level control associated with the final blend container, the container being in the form of a tank, such that blended product is always available from the tank on a continuous flow basis up to a specified maximum outflow rate and such that adequate tank capacity is available to allow completion of an entire summed digital dose from the blending apparatus above the maximum tank liquid level established by the liquid level control.

In summary, the present invention consists of a method and apparatus providing for the continuous stream blending, preferably on a mass ratio basis, of two or more liquids. Each individual liquid stream is synchronously dosed in precise mass ratio to a common mixing point. The flow of each stream is on-off or digital. Repeated mass ratio doses of defined and matching flow interval, referred to as synchronous digital flow, interspersed with a defined interval of no flow, constitutes digital flow at a net rate sufficient to meet or exceed some required take-away of the blended liquids. In one preferred embodiment, each dose stream flow is produced and measured by an apparatus preferably consisting of a device for initiating liquid flow in the form of a controller and a precision positive displacement pump, the apparatus further including Coriolis mass meter and a precision flow stream shut-off device. The servo motor and controller establish and control a periodic and intermittent flow rate necessary to displace a defined mass dose in a precisely defined flow interval. The flow interval is measured against a precision millisecond digital clock. The Coriolis mass meter is used only to totalize mass flow to define the desired mass dose during the defined digital flow interval. The flow stream shut-off device ensures precise delivery of the mass dose to the common mixing point. The flow rate of a stream is automatically adjusted by the control electronics until the required mass dose is delivered in the defined flow interval.

Because each flow stream starts and stops simultaneously regardless of the mass dose associated with each stream, blending or mixing of the streams at a common intersection to a defined mass ratio formula is facilitated by the simultaneous and kinetic collision and resultant mixing of the coincident flows in a mixing chamber. The blending apparatus can be started at will and can be stopped at the end of each defined dose interval, typically every 5000 mS. This method allows the apparatus to be operated in liquids process environments where frequent stop and start conditions are prevalent, without any penalty or error in mass ratio accuracy or blending efficacy. Use of PLC or PC system control in conjunction with a precision millisecond (1000 Hz) clock signal allows automatic establishment of mass dose and flow stream synchronization at start up, as well as self-checking and correction of mass dose and flow synchrony with each digital flow cycle. Operation is preferably based upon a mass ratio recipe or formula, although the control software also provides for conversion of volumetric formulas to mass. The apparatus automatically adapts to changes in take-away flow rate by varying the off time or no flow interval between synchronous digital doses, thus eliminating manual or electronic adjustment or recalibration of the liquid flow streams as take-away demand varies.

The foregoing objects and other objects and advantages of the present invention will be better understood after a consideration of the following detailed description taken in conjunction with the accompanying drawings in which preferred forms of this invention are illustrated.

DETAILED DESCRIPTION

By definition a continuous flow liquids blending system must make fully mixed product available at its output at a make up rate equal to take-away demand. The take-away demand rate is generally defined by the running speed of the liquid product packaging line being serviced by the continuous stream blending system.

An intermittent motion on-off (digital flow) multichannel batching system which produces small synchronized flow batches of liquid product at a rate greater than the take-away rate can function as a continuous stream system. It is upon this central concept that the method and apparatus herein disclosed is based. One great virtue of this continuous blending design methodology is that the extremely high mass dose accuracy (0.15% to 0.25%) of each stream component is achieved on a pre-engineered basis which eliminates the sources of error found in feedback loop designs. And, perhaps equally important in practical terms, the final blended continuous stream flow can be turned on and off at will with absolutely no penalty in accuracy. The system volume is very small, and virtually all made up product can be utilized at the end of a blend run. Finally, the output of the system can be directly and automatically varied to conform to the take-away requirements, thanks to the on-off digital design.

Figure 1:
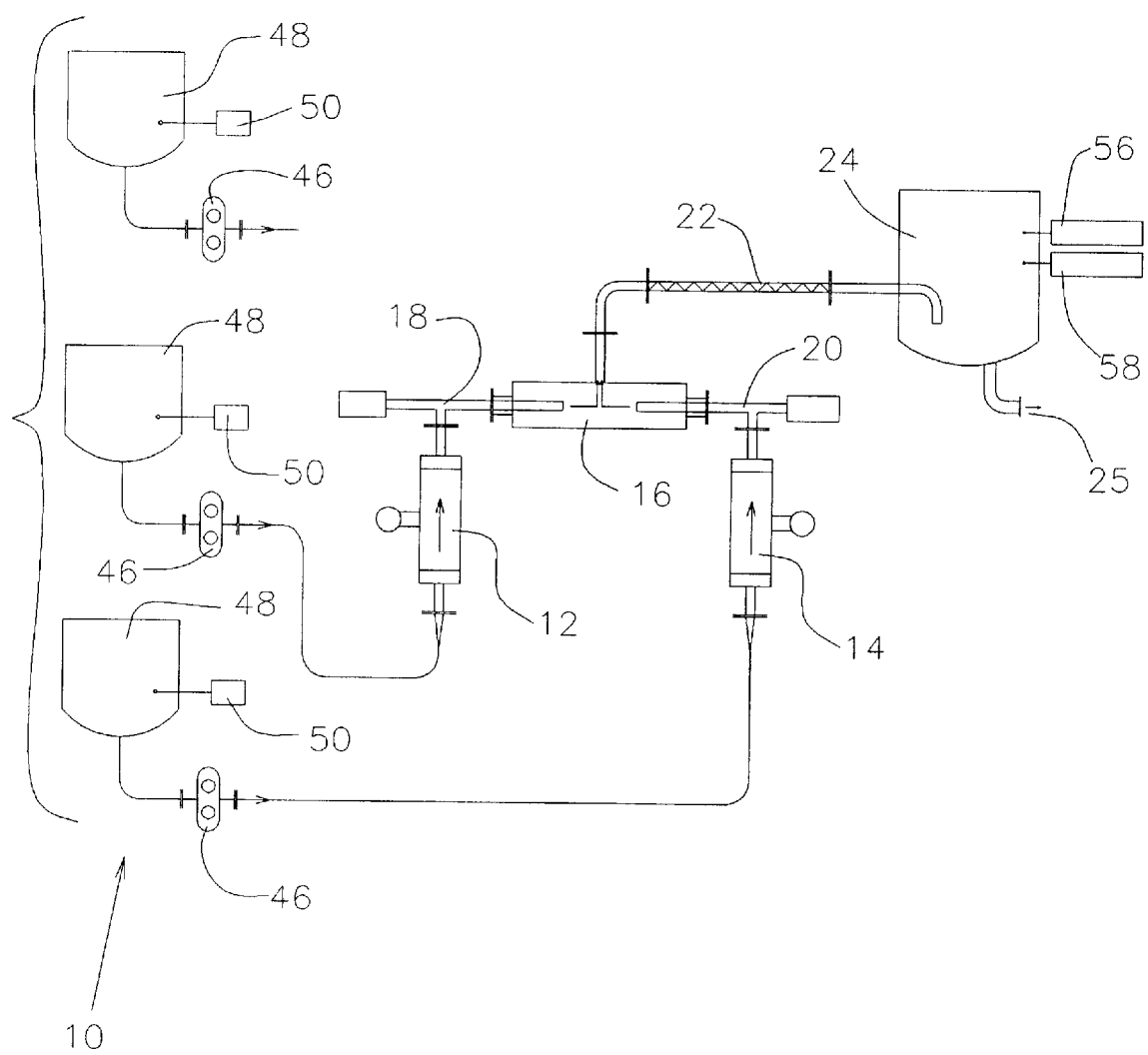
FIG. 1 is a diagrammatic view of a first preferred embodiment of the continuous liquid steam digital blending system of this invention.

Consider FIG. 1 for a diagram of a first preferred embodiment of the continuous liquid stream digital blending system of this invention, which is indicated generally at 10. Illustrated in simplified terms is a basic two stream system. In reviewing the drawings associated with this disclosure, it should be understood that only two digital flow streams are fully illustrated with each embodiment, this being done for the sake of simplicity of illustration. Thus, there is no technical limit to the number of flow streams which can be utilized in the apparatus. To this end, FIG. 1 also partially shows a third digital flow stream.

In operation, the various components are dosed in precisely correct mass ratio through Coriolis mass meters into a small injection chamber referred to as a kinetic mixing chamber 16. Each dose aliquot is transmitted from a supply source to a mixing chamber by a delivery assembly which include a positive displacement pump, driven by a suitable digitally controlled servo motor, the pumped dose passing through a Coriolis mass meter, and positive shut-off dose stream injector. The delivery assemblies are controlled to insure that during each dosing cycle, a precise mass ratio is delivered to a common mixing point. Thus, each dose aliquot is synchronized to the other dose aliquots so that they all start simultaneously and end simultaneously. Each dose aliquot has a known precise repeatability, by design. Each positive shut-off dose stream injector 18, 20 has a true positive shut-off device at the very tip of its flow tube. These devices are sometimes referred to as cut-off nozzles and are well known in the art. Thus, the entire mass dose fraction of each liquid component is guaranteed to enter the injection chamber.

In the first preferred embodiment shown in FIG. 1, the kinetic mixing chamber connects to a static in-line mixer 22 and then into the final blend container in the form of tank 24, the blended product being discharged through outlet 25. It is important to understand that by the nature of the kinetic mixing chamber, the digital batch, correct in mass ratio for each constituent stream, is expelled by the next successive dose from the chamber and into the in-line static mixer (also known as a ribbon type mixer). During digital dose flow, the simultaneous flow of all formula fractions into the injection chamber 16 creates an aggressive and highly effective kinetic mixing action.

Figure 2:
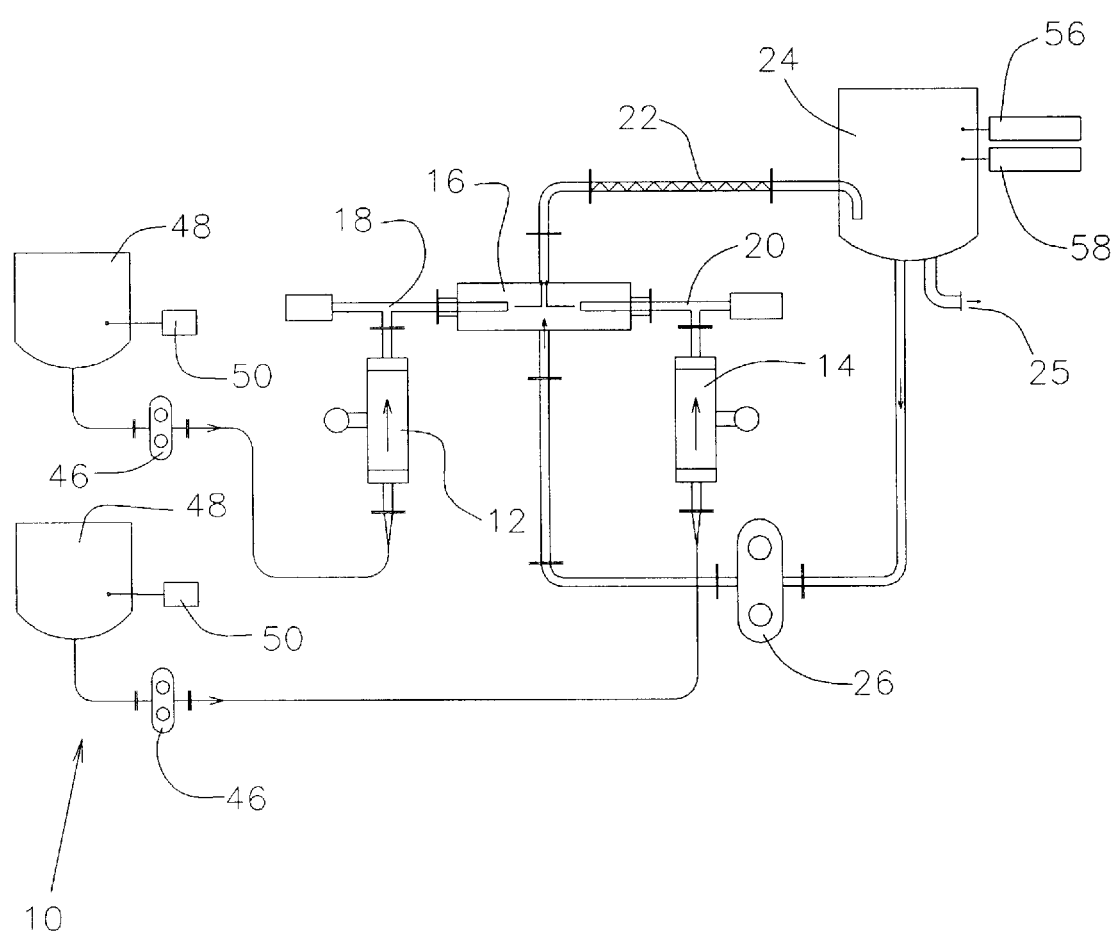
FIG. 2 is a diagrammatic view of a second preferred embodiment.

In a second preferred embodiment shown in FIG. 2, the kinetic mixing chamber 16 is inserted into a dynamic pump based flow loop, which includes mixing pump 26. In this arrangement, no portion of any dose can remain in the chamber. Where used, the dynamic flow loop ensures that all injected mass ratio fractions are forced into the in line mixer loop on a continuous motion basis.

With any of the embodiments herein disclosed, the dual mixing dynamics assures that even if a slight mismatch in flow synchronization of the mass ratio fractions were to occur in a digital dose cycle, no final stream blending imprecision can occur.

Figure 3:
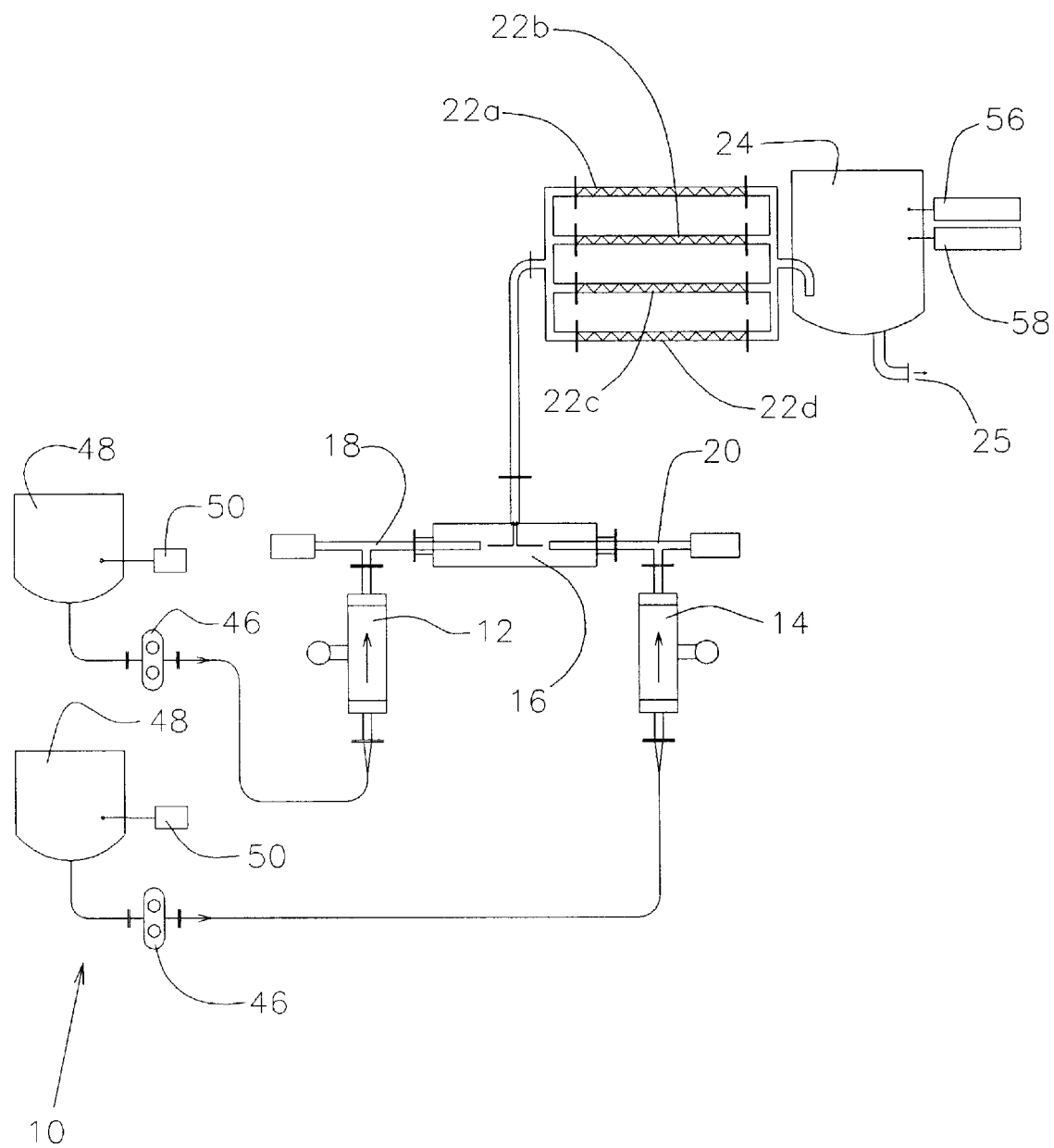
FIGS. 3–5 are diagrammatic views of third through fifth preferred embodiments, respectively.

In a third preferred embodiment shown in FIG. 3, which is a variation of the first preferred embodiment, the flow from the kinetic mixing chamber is subdivided to several static in-line mixing channels 22a–22d. This allows a net reduction in system back pressure while retaining the necessary flow velocities through the static mixing elements necessary for effective mixing to occur.

Figure 4:
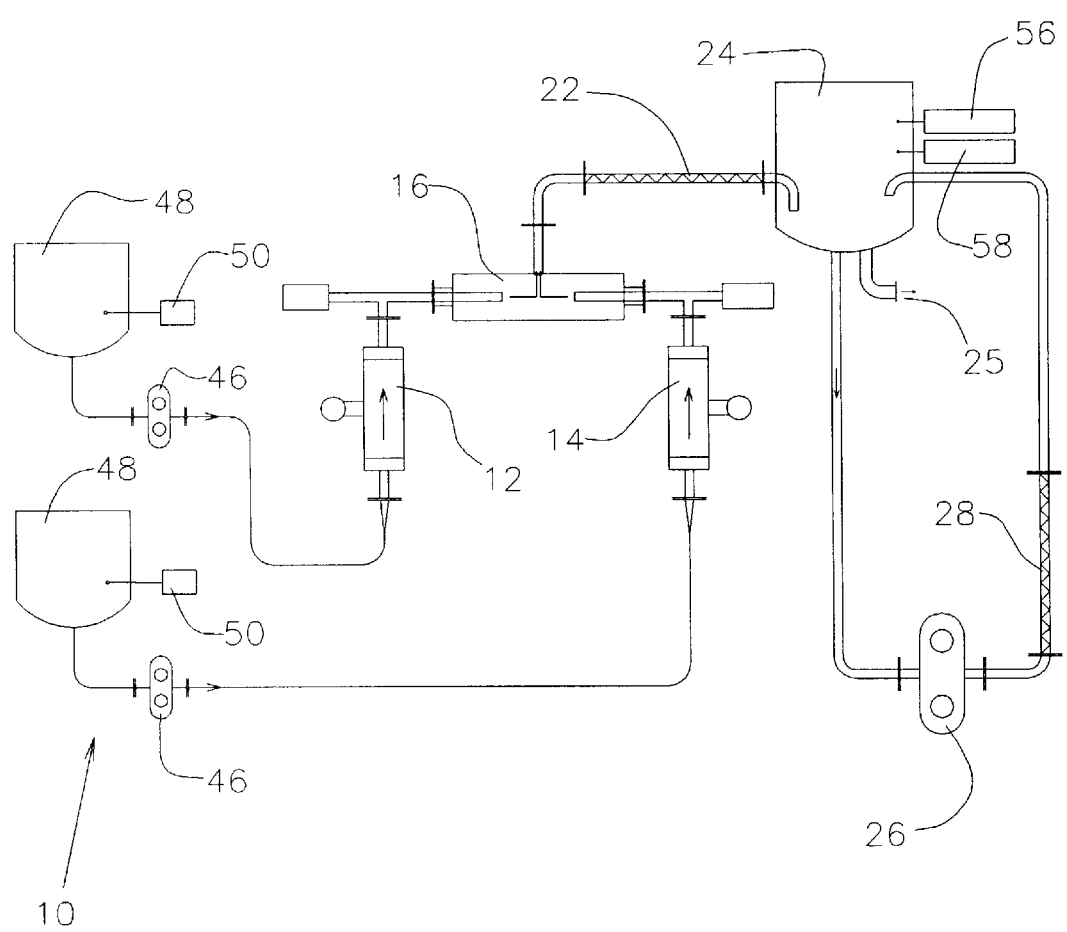

In a fourth preferred embodiment shown in FIG. 4, which is a variation of the design shown in FIG. 2, the pump based dynamic mixing is removed from the kinetic mixing circuit and, instead, the pump 26 removes liquid from the final blend tank and returns it to the tank through an additional in-line mixer 28. This arrangement is useful in instances where substantial periods of no demand flow from the tank may be expected but where the final blend liquid is required to remain in agitation or motion.

Figure 5:
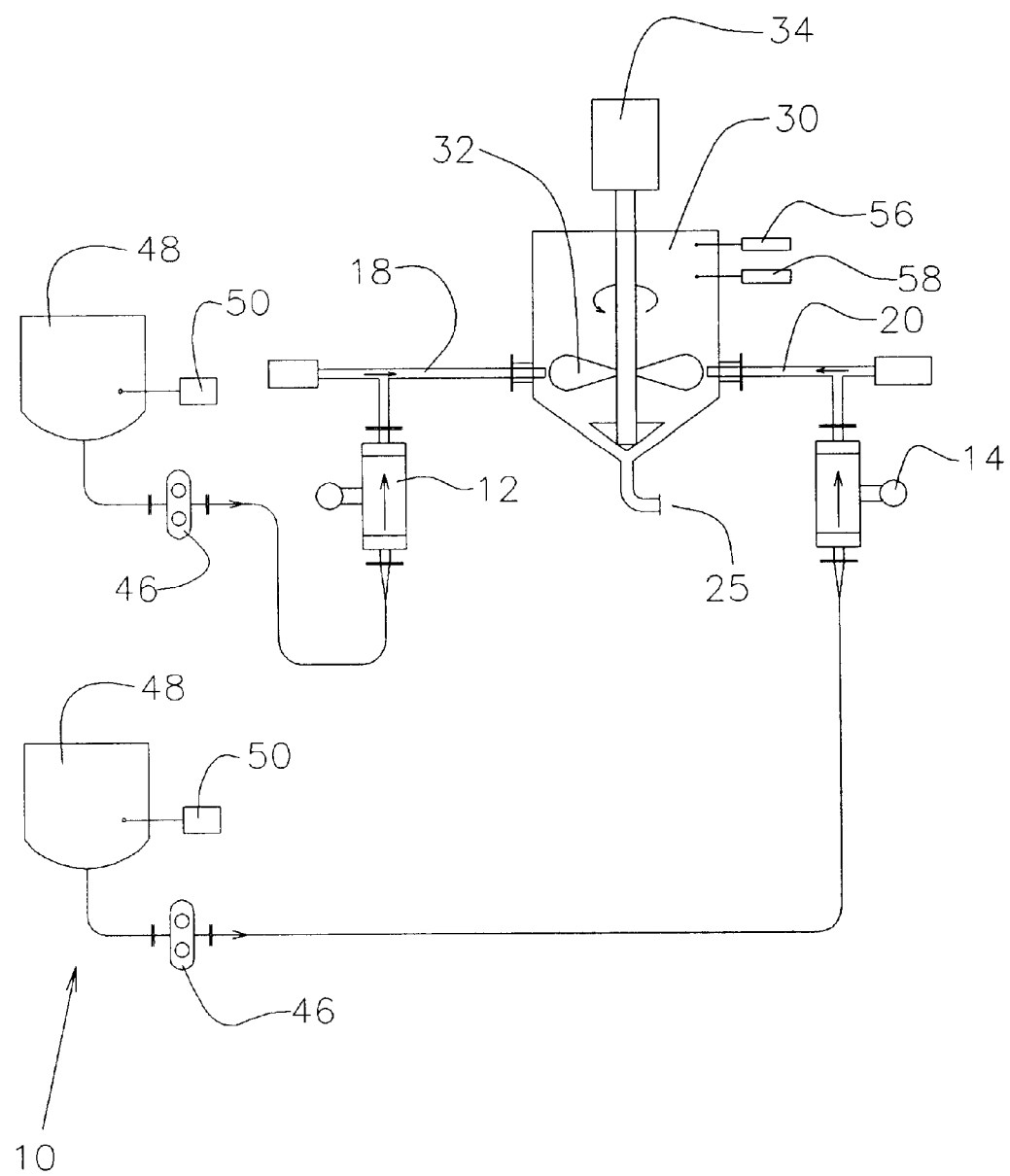

In a fifth preferred embodiment shown in FIG. 5, the kinetic mixing method is not used, but instead the positive shut-off dose stream injectors feed directly into a mixing chamber in the form of a continuous stream final blend tank 30 where the blend is mixed by a rotating blade type mixer 32 which is driven by motor 34. This method is useful where the constituent flows blend with particular ease, as well as in instances where larger particulate inclusions are found in the flow stream. It is also illustrative of a configuration of the invention as a synchronized flow batching system. When used as a mass based batching system, the synchronous flow of each constituent into the batch tank remains an important advantage in promoting ease and thoroughness of mixing, and the virtues of frequent dose accuracy checking are preserved as well.

Figure 6:
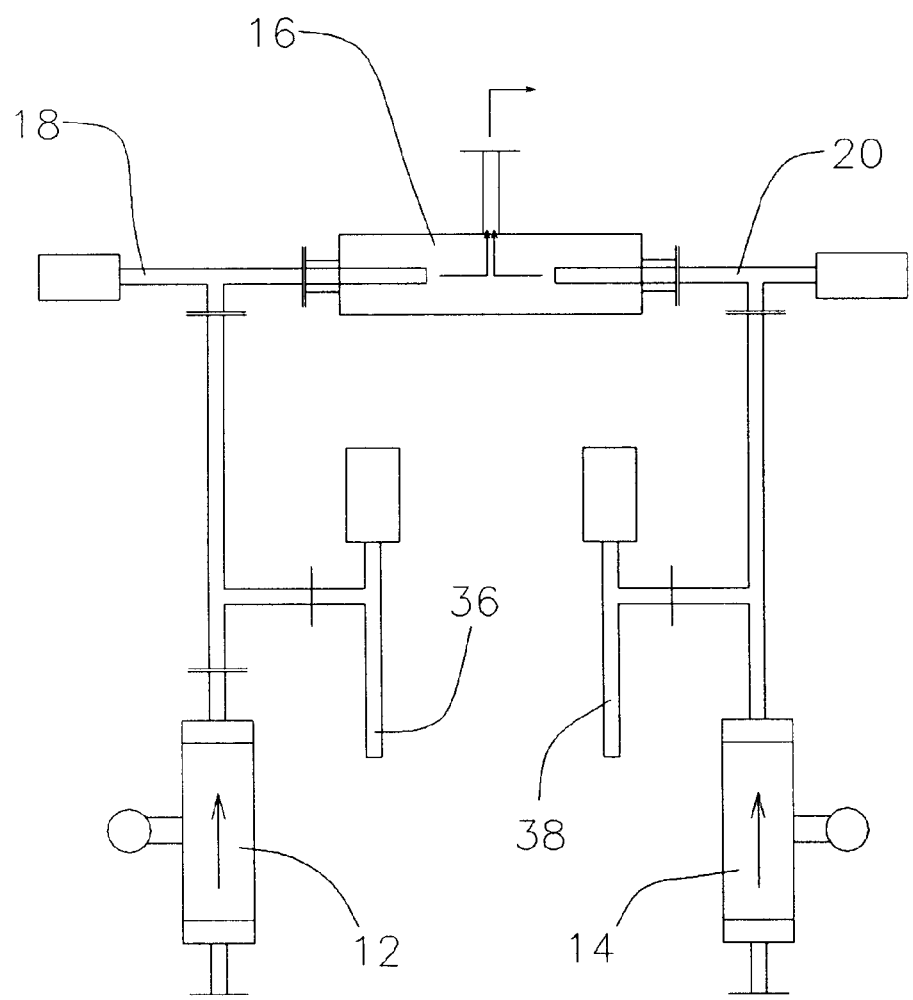
FIG. 6 shows how the embodiments of FIGS. 1–5 may be modified to provide dose sampling of each flow stream.
Figure 7:
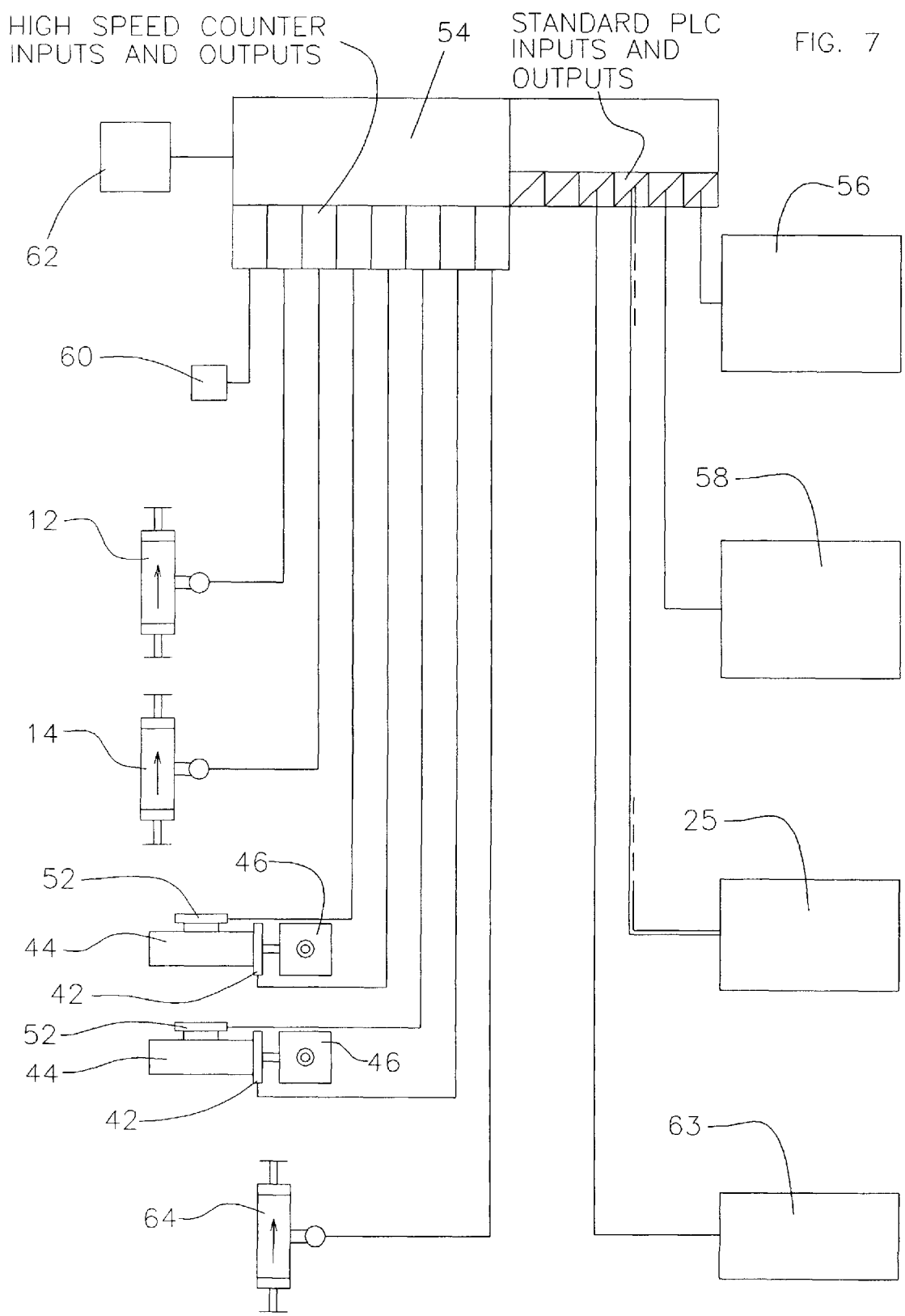
FIG. 7 shows a control circuit for the embodiments set forth in FIG. 1–5.

In any of the preferred embodiments, it is possible to provide a separate positive shut-off dose stream nozzle 36, 38 for the purpose of providing dose sampling capability on each flow stream. As illustrated in FIG. 6, this is an important capability in that, in conjunction with the digital dose design, it allows direct empirical calibration and verification of mass ratios. This is not possible with PID continuous flow blending designs.

In operation, the combined flow rates into the continuous stream final blend tank are greater than a planned maximum take-away rate. Typically, the combined rate is established to be about 30% faster in unit time than the take-away rate. This allows a very tight and responsive in-out relationship to be established and maintained. In the typical case of digital flow for five seconds at a 1.30 multiple of the maximum demand rate with a one second interval between digital doses, the net digital flow to the continuous stream final blend tank is at a rate multiple of 1.083 of maximum demand.

The elevated infeed flow rates of each formula component allows short (typically five seconds) synchronized runs of each mass meter feed channel. Each channel is electronically set to dose its correct mass ratio in the run time allowed. An intervening time between digital doses, typically of one second, allows the extensive monitoring and computations required to confirm cycle by cycle mass ratio dose accuracy and synchrony of the stream flows. The off time or no flow period also allows time for electronic adjustment of stream dose flow rates as may be required to maintain synchronous flow.

It is important to understand the selection of a five second digital dose duration time in the context of the nature of Coriolis mass flow meters. Co-pending application 08/969, 231 discloses "A Net Mass Liquid Filler" which uses a Coriolis mass meter, and which provides extensive discussion of the requirements for use of such flow meters in dosing systems. This application is incorporated by reference into this disclosure. By way of brief review, any particular Coriolis mass meter can be characterized as having a minimum and maximum flow rate below or above which flow accuracy degrades. Further, because of meter mass flow signal start-up latency, there is a minimum flow measuring period associated with any particular flow rate within the meter's range in order to achieve the desired accuracy of flow data. Thus, it can be shown that in the present case, a flow period of five seconds is sufficient to assure the maximum possible accuracy of mass flow.

In the present invention, accuracy is further enhanced by novelly limiting maximum mass flow rate through any given size mass meter to 90 percent of the manufacturers stated maximum, and by limiting the minimum mass flow to a rate above 20 percent of the manufacturers stated maximum.

In the present invention, two separate and redundant electronic alarm monitors are established to assure that the mass flow rate through each of the mass meters does not fall below or exceed the established limits. A first alarm monitors the frequency of the digital incremental encoder 42 which is used to provide a digital speed regulation of the pump drive servo motor 44. The motor in turn selectively drives a pump 46 to deliver a liquid from a bulk supply source 48 to the associated Coriolis mass meter 12 or 14 and then to the associated dose stream injector 18 or 20. The fluid level in each tank 48 is controlled by a level control 50. Because the encoder frequency directly reflects the pump RPM and therefore its flow rate, a minimum and maximum frequency can directly be used to establish an out of specification flow alarm. Likewise, a second redundant flow rate alarm is provided based upon monitoring the variable frequency mass flow output from the mass meter, using the same logic format and methodology.

The control methods associated with each discrete flow stream apparatus is unique and important to the overall design. The flow rate of the liquid dose through each Coriolis mass meter 12 or 14 is controlled by its associated flow pump 46 which is directly coupled to a servo motor 44. The purpose of this control is to make the flow rate through the Coriolis mass meter 12 or 14 invariant during the mass flow measurement period. The servo motor 44 is controlled by an electronic servo drive controller 52 which takes velocity regulating feedback from an incremental digital encoder 42 fitted to the servo motor. Because the encoder preferably is digital it is free from drift. The servo drive electronics 52 are capable of very accurate regulation of servo motor speed. By design, a 100 percent change in the load on the servo motor 44 will have only one quarter of one percent change effect on the rotation speed of the motor. This degree of load change on the servo drive in the system herein disclosed is extremely unlikely but is a useful worst case parameter.

As taught in application 08/969,231 (herein referenced), maintaining a consistent volumetric flow rate through a Coriolis mass meter during its mass flow measurement period is a key control requirement to precision mass dosing using such a device. Thus, the ability to hold the flow rate through the mass meter to within 0.25 percent of its set point is a crucial control concept. Consider that in the 5000 mS synchronous flow period of the system, an error of 0.25% represents 12.5 milliseconds. A change of this magnitude in flow through the mass meter can cause a mass flow rate measurement error of no more than 25 percent of the volumetric error. Thus, in this case, the error could be no more than 0.0625 percent.

Thus it is clear that the flow rates through the mass meters in the apparatus of the present invention are controlled only by the servo drives and it is equally clear that allowing the mass flow rate to be altered during mass flow measurement, as is inherently the case and intention in the control designs of the prior art, is incorrect.

It should be noted that while a digital incremental encoder 42 is the preferred velocity feedback device in the present invention, many other devices could also be utilized including motor voltage or current, resolvers and tachometers.

Further considering the control methods associated with each discrete flow stream apparatus of the present invention, the Coriolis mass flow meter serves only to define the magnitude of the digital flow mass dose. The meter outputs a digital pulse train, the frequency of which varies in direct proportion to mass flow. This pulse train is counted against a preset number by the high speed counter in the system control electronics 54. In the present invention the Coriolis mass flow meter does not have any control linkage or function relative to the flow rate of liquid moving through it, except to define when a desired mass dose has moved through the device, wherein flow through the meter is stopped.

As the digital batch is dosed and mixed, it flows into a small finished blend stream feed tank 24. The one second "cycle time" referred to above is imposed at the end of each digital batch, after which another digital batch can be produced if called for. Electronic level controls 56, 58 in the small tank provide for fully automatic startup to charge the fluid flow pathway. These level controls also automatically control the overall flow pattern in the system. Thus, a "max" level control 56 is positioned within the tank to allow sufficient capacity for completion of any digital batch in progress. Similarly, a "run" level control 58 causes digital blending to begin whenever tank level falls below the run sense point. The max-run differential is generally tightly set, typically to the equivalent of one complete digital cycle of the summed constituent streams. In practical terms this holds tank level quite tightly about the run sensor level, since this is really the "trip" which initiates digital batching. A separate pair of high alarm and low alarm sensors (not shown) guard against any possible feed malfunction. It is useful to note that, in general, it is desirable to hold the total system volume of a blending apparatus as small as practical. A small system volume minimizes loss of any final blend liquid which cannot be utilized, and greatly reduces clean-in-place (CIP) effluent volumes. A unique merit of the present invention is that the continuous stream final blend tank capacity can be as small as two blended digital doses, and typically is no more than four. It is also contemplated that the final blend tank can be enlarged as desired in order to increase final blended product capacity and thus extend depletion time as may be required.

A major advantage of this novel continuous stream blending architecture is that adequate tank volume provision can be made to ensure the availability of sufficient blended product to complete all fills in progress on the filling line, even with a forced shutdown of the feed streams. This assures an orderly packaging line shutdown without the possibility of partial fills. It is also important to note that any product reaching the filler must be, by apparatus design, correctly blended. Neither of these virtues is possible with older style blending systems using PID feedback control loops. Indeed, filler starvation and containers filled with misblended product are known problems in systems using PID control loops.

Normal tank excursion in the digital dose design would require surge or overrun capacity above the maximum level of only one "digital" batch, which in a 1668 pound per minute (approximately 200 GPM) continuous flow blending system is about 216 pounds (approximately 26 gallons) of finished product. In an 834 pound per minute (approximately 100 GPM) continuous stream capacity system, the tank max level surge or overrun capacity would typically be only about 108 pounds (approximately 13 gallons), the equivalent of one system digital flow cycle. Note that the continuous stream output of the final blend tank can be started and stopped and restarted at will at any time without the possibility of introduced error since any digital batch in process can be completed without compromise, regardless of the status of the continuous stream output. This separation of the blending and continuous stream feed capability of the system is a unique and fundamentally important aspect of the invention.

One practical example of system operation is provided with this disclosure, at a maximum flow rate of 834 pounds (100 GPM approximately). Systems are practical with feed rates ranging from a fraction of a pound per minute to well over 1500 pounds per minute.

In the present invention, each liquid component flow channel is modular and consists of a high precision dosing servo-pump unit 44, 46 and an appropriately sized Coriolis mass meter 12 or 14. Together with a positive shut-off dose stream injector 18 or 20, these define a complete dosing channel apparatus. The design of several (typically seven) pre-engineered modular channel sizes allows virtually any size dose to be handled, as required by the batch formula, on a modular mix and match basis. And, the fact that each channel can be software calibrated against a precision clock frequency (established by a precision external 1 KHz clock) common to all dose channels in order to match flow rates with the other batch dose channels means that the major source of system error of previous designs, flow rate adjustments for changing ratio shifts or take-away rates, is totally eliminated. This approach also substantially simplifies the software and set-up computations required of the system. The broad dynamic range of each flow channel size (typically over 4:1) ensures that a system design can be successfully utilized across a broad range of product formulas without the need for extensive re-configurations and additions. Table 1 on the following page discloses seven typical dosing channel

TABLE 1

TYPICAL CONTINUOUS LIQUID STREAM DOSING CHANNELS

Channel Size 1

| | |
|---|---|
| Minimum Mass Flow: | 67 grams/min. // .14666 Lbs/min. (.0176 GPM) |
| Maximum Mass Flow: | 300 grams/min. // .66 Lbs/min. (.0791 GPM) |
| Typical Mass Meter: | Endress & Hauser S01 |
| Typical Dose Pump: | Oden 125T |

Channel Size 2

| | |
|---|---|
| Minimum Mass Flow: | 0.336 Kilo/min. // .74 Lbs/min. (.089 GPM) |
| Maximum Mass Flow: | 1.510 Kilo/min. // 3.33 Lbs/min. (.399 GPM) |
| Typical Mass Meter: | Endress & Hauser S02 |
| Typical Dose Pump: | Oden 657T |

Channel Size 3

| | |
|---|---|
| Minimum Mass Flow: | 1.54 Kilo/min. // 3.4 Lbs/min. (.41 GPM) |
| Maximum Mass Flow: | 6.94 Kilo/min. // 15.3 Lbs/min. (1.83 GPM) |
| Typical Mass Meter: | Endress & Hauser S04 |
| Typical Dose Pump: | Waukesha Universal Series Size 6 |

TABLE 1-continued

TYPICAL CONTINUOUS LIQUID STREAM DOSING CHANNELS

Channel Size 4

| | |
|---|---|
| Minimum Mass Flow: | 6.67 Kilo/min. // 14.7 Lbs/min. (1.76 GPM) |
| Maximum Mass Flow: | 30.01 Kilo/min. // 66.15 Lbs/min. (7.93 GPM) |
| Typical Mass Meter: | Endress & Hauser T08 |
| Typical Dose Pumps: | Waukesha Universal Series Size 6/Size 15/Size 18 |

Channel Size 5

| | |
|---|---|
| Minimum Mass Flow: | 21.59 Kilo/min. // 47.6 Lbs/min. (5.70 GPM) |
| Maximum Mass Flow: | 97.16 Kilo/min. // 214.2 Lbs/min. (25.67 GPM) |
| Typical Mass Meter: | Endress & Hauser T15 |
| Typical Dose Pumps: | Waukesha Universal Series Size 15/Size 18/Size 30/Size 60 |

Channel Size 6

| | |
|---|---|
| Minimum Mass Flow: | 59.88 Kilo/min. // 132 Lbs/min. (15.82 GPM) |
| Maximum Mass Flow: | 269.44 Kilo/min. // 594 Lbs/min. (71.18 GPM) |
| Typical Mass Meter: | Endress & Hauser T25 |
| Typical Dose Pumps: | Waukesha Universal Series Size 30/Size 60/Size 130 |

Channel Size 7

| | |
|---|---|
| Minimum Mass Flow: | 149.69 Kilo/min. // 330 Lbs/min. (39.54 GPM) |
| Maximum Mass Flow: | 673.60 Kilo/min. // 1485 Lbs/min. (177.95 GPM) |
| Typical Mass Meter: | Endress & Hauser T40 |
| Typical Dose Pumps: | Waukesha Universal Series Size 60/Size 130 |

Note
1: Maximum mass flow is 90% of meter manufacturer's maximum rated flow.
2: Minimum mass flow is 20% of meter manufacturer's maximum rated flow.

configurations. These configurations have generally overlapping flow ranges and are particularly designed to allow a very broad range of liquids to be handled, including water-like to non free-flowing, as well as liquid slurries and liquids with solids inclusions.

Even though the present invention is particularly intended to operate as a mass based continuous liquid stream blending system, many liquid product formulas are expressed in volumetric terms, reflecting the nature of the predominance of historically volumetric batching technology. Thus, in the computational example given with this disclosure, conversion of formula from volumetric to mass is included as part of the computations. In instances where direct mass ratios are known, volumetric conversion can be omitted.

It is also important to note that the necessary computations can be completed in any desired standard units including English or metric.

As a means of illustration, consider the following operating example:

OPERATING EXAMPLE

Configure a system to provide a continuous flow of liquid product to a filling line at the maximum rate of 100 GPM.

Note that the math procedures described below are actually performed in the batch computer 54, typically a high end PLC, with a color graphic active matrix LCD PC based operator interface 62.

The product formula expressed in volume ratio and units of flow per minute is:

| Component | Formula Volume (GPM) | Component Specific Gravity |
|---|---|---|
| 1. Water | 56.95 | 1.00 |
| 2. Flavor A | 6.25 | 0.91 |
| 3. Flavor B | 9.20 | 0.97 |
| 4. Color A | 0.88 | 1.12 |
| 5. Color B | 1.05 | 1.04 |
| 6. Liquid Sweetener | 18.75 | 1.21 |
| 7. Preservative | 6.92 | 0.89 |
| Total | 100 GPM | |

Step 1

Convert the volumetric formula to a mass formula.

To convert the volumetric formula to mass ratio, each formula component gallon per minute volumetric ratio is multiplied by 8.3453 to convert to a water weight equivalent (in this instance in pounds). This figure is then multiplied by the specific gravity of each formula component to obtain a pounds per minute of flow number for each constituent liquid. The pounds per minute result is rounded to two decimals in this text for convenience. Thus:

| Component | GPM | Specific Gravity | Pounds Per Minute (PPM) |
|---|---|---|---|
| 1. Water | 56.95 | 1.00 | 475.27 |
| 2. Flavor A | 6.25 | 0.91 | 47.47 |
| 3. Flavor B | 9.20 | 0.97 | 74.47 |
| 4. Color A | 0.88 | 1.12 | 8.23 |
| 5. Color B | 1.05 | 1.04 | 9.11 |
| 6. Liquid Sweetener | 18.75 | 1.21 | 189.33 |
| 7. Preservative | 6.92 | 0.89 | 51.40 |

Note that each flow rate of each formula component is now expressed in mass units per minute.

Step 2

Restate the mass based formula in terms of required infeed rates, adjusted upward for system mix time and for transfer time of digital batches to the continuous stream final blend tank.

In this example, digital batch flow rates will be increased to 30% above the maximum take-away rate. The additional flow factor provides a generous allowance for numerous system function actuation times including a one second minimum cycle time between successive digital batches. This means that the mass flow rate of each formula component is increased by the necessary increment to ensure that the final 100 GPM continuous stream blended flow is available. In this example, each mass flow rate is multiplied by 1.30 to effect the necessary increase in flow in unit time. Thus:

| Component | Base PPM | Time Adjusted PPM |
|---|---|---|
| 1. Water | 475.27 | 617.85 |
| 2. Flavor A | 47.47 | 61.71 |
| 3. Flavor B | 74.47 | 96.81 |
| 4. Color A | 8.23 | 10.70 |
| 5. Color B | 9.11 | 11.84 |
| 6. Liquid Sweetener | 189.33 | 246.13 |
| 7. Preservative | 51.40 | 66.82 |

Step 3

Define the dose channel size required for each flow component. This is done by simply comparing the time adjusted mass flows of each component to the seven pre-engineered dosing channels and selecting the appropriate choice (see Table 1). It should be noted that the channel flow rates essentially overlap and component stream viscosities may influence a selection. Software exists to evaluate these influences. However, for illustration here, straightforward sizing choices will be made. Thus:

| Component | Dosing Channel Size |
|---|---|
| 1. Water | Size 7 |
| 2. Flavor A | Size 4 |
| 3. Flavor B | Size 5 |
| 4. Color A | Size 3 |
| 5. Color B | Size 3 |
| 6. Liquid Sweetener | Size 6 |
| 7. Preservative | Size 4 |

It should be noted that in the above channel listing, the water component can be favorably treated as a special case. Because water is essentially (relatively) unchanging in physical properties over a substantial range of conditions, it can be digitally dosed volumetrically and the volumetric data units can be treated as mass units. This allows a magnetic flow meter ("mag meter") to be utilized in this unique case. Mag meters are relatively inexpensive compared to mass meters, capable of very high flow with virtually no pressure drop and are very accurate, particularly when applied in an essentially steady state system as in the present case. Thus, the use of a mass meter is not essential on a water component channel.

Step 4

Adjust the mass flow rate of each dose channel to deliver the correct digital dose mass in a 5000 millisecond run time.

This is done to limit the digital batch size. Remember that continuous stream blended flow is achieved by repetitive processing of small sub-total batches. Extensive experiments with mass meters have shown that a minimum run time is needed to achieve good accuracy and repeatability. A five second on period is near the minimum run time allowable for the best possible Coriolis mass meter accuracy. The five second dose period also limits any possible synchronous flow error to this limited time period before automatic correction of dose delivery time is effected during the next intervening one second cycle time. The batch component mass flows per minute have been previously derived as pounds per minute in Step 2. To re-express these flows, in ratio, for a five second flow period requires only that they be divided by twelve. Thus:

| Component | Five Second Mass Flow (Pounds) |
|---|---|
| 1. Water | 51.49 |
| 2. Flavor A | 5.14 |
| 3. Flavor B | 8.07 |
| 4. Color A | 0.89 |
| 5. Color B | 0.99 |
| 6. Liquid Sweetener | 20.51 |
| 7. Preservative | 5.57 |

The digital batch mass total is 92.66 pounds. This is a batch volume of approximately 11.10 gallons.

Step 5

Establish correct mass dose for each stream component.

Mass dose may be established in one of two ways. In the first, the Coriolis mass meter has been previously calibrated and mass dose can be directly entered in engineering units (in this given example, in pounds) using the operator interface. The particular liquid stream dosing channel size is also entered. This allows the PC 54 to enter a pre-set pulse count into the PLC high speed counter (not shown), the count representing a mass dose. The PC also uses a look up table to define a servo velocity at which the mass dose will be delivered in approximately 5000 mS.

In the second method of establishing a mass dose, an actual sample and calibration procedure can be carried out. As discussed elsewhere in this disclosure with reference to FIG. 6, provision is made to allow sample doses on each flow channel to be discretely collected and weighed. Thus, in this second method, the desired mass dose is entered as in the first case. A sample dose is collected by selecting the mass dose calibration procedure via the operator interface. The sample dose is weighed, typically using a national standards traceable calibrated scale. The sample weight is entered into the PC operator interface 62. In addition, other process variables, such as temperature, may be entered into the PLC 54 via sensors 63. The PC divides the sample weight by the mass dose pulse count received from the mass meter to establish the dose. This provides the pulses per unit of mass. The PC multiplies the pulses per mass unit by the desired mass dose, yielding a new pulse count to be entered into the PLC pre-set high speed counter.

In the present example, if a test dose of 52.65 pounds was obtained for the water stream, and the trial pulse count entered by the PC into the PLC pre-set counter was 26,440, the pulse count per pound would be 502.18. Multiplying 502.18 by the desired dose of 51.49 pounds yields a calibrated pre-set counter valve of 25,857, and the correct mass dose is established.

Step 6

Adjust mass dose delivery time to 5000 mS for each constituent stream.

The flow rate of each flow channel can be adjusted in a linear fashion over 4028 discrete steps. These increments represent essentially zero flow to maximum flow, based upon the servo velocity setting entered into the servo controller by the PLC.

Initially, an approximate dose flow rate is entered based on a look up flow table, the table being specific to a particular dose channel size. After the approximate dose time entry has been made, a sample digital dose cycle is made.

A highly stable quartz crystal precision millisecond clock (1000 Hz) 60 is provided to a PLC high speed counter input. (This cannot be internally generated in the PLC to suitable resolution or accuracy.) This clock allows the PLC to define a precise dose channel run time of 5000 mS without error. Thus, with the start of each digital dose, the clock is also started. The clock is stopped at the end of the dose and therefore its duration can be measured to within one millisecond. The actual run time is compared ratiometrically to the 5000 mS target and the 4028 step servo velocity command signal is altered accordingly.

In the present example, if the test dose time was measured to be 5396 mS, the discrepancy would be 396 mS; 396 divided by 5000 is 0.0792. Thus the servo velocity setting must be altered by the error increment expressed as a decimal. Thus, if the servo velocity setting were 2417, the setting would be altered by 7.92 percent, or 2417 times 0.0792 which is a change of 191 steps. Note that in the case where the flow time is too long, flow rate must be increased and the servo velocity setting is increased. If the flow time is below 5000 mS, the servo velocity setting must be decreased. In the present example, the servo velocity setting is decreased by 191 steps to 2226. Note that the ability of the system to resolve the actual flow time is 1 mS and its ability to adjust flow is to one part in 4028. Thus, by following the defined procedure, the dose flow time can be established to within a few milliseconds of the 5000 mS target time.

Step 7

Adjust each stream for simultaneous synchronous flow.

After each stream mass dose has been established and each dose flow time has been trimmed to a 5000 mS duration, both as described above, the apparatus is operated as a complete system with each dose stream flow beginning simultaneously. It is to be expected that when simultaneous flow occurs, the back pressure exerted upon each flow pump will change. Under these conditions, even with the selection of rotary pumps which are particularly suited for metering and dosing applications, and even with very precise servo velocity feedback compensation, some shift in flow times will occur. This shift will typically be an increase in dose time.

Accordingly, the last step in the operating configuration process is to automatically re-trim the synchronous run time of each channel with all channels operating. This is done in the same manner as described in Step 6.

It will be understood that the configuration process herein described need only be undertaken once for each given liquid product formula. The configuration data is stored in the controls system on a non-volatile basis and allows re-configuration of the apparatus to the stored parameters at will.

An important and novel aspect of the present invention is the design's ability to check flow synchrony of every flow channel with each dose cycle. This self-limits error magnitude, prevents error repetition and assures precisely matched synchronous flow with each cycle under changing conditions. The method of checking and adjustment is akin to that described under Step 6 above and is undertaken in the no flow interval between successive dose cycles.

It is also important to understand that as the dose synchronization procedure is carried out, and with each between dose error check, a software alarm monitors the 4028 step servo velocity signal link to each flow channel such that if a required flow adjustment cannot be made because the servo velocity span has been exceeded, an alarm is provided as well as operator interface diagnostic annunciation.

Also included in the configuration software are extensive mathematical checks of computational accuracy. For example, discrete dose computations are totalized and compared to the digital batch dose total to detect math manipulation errors.

It is worthy of note that in an instance where a particular liquid product recipe requires a mass dose flow above that which can be provided by any available flow channel configuration, it is permissible and practical to deliver the required mass ratio utilizing two smaller (lower flow) dose channels. Likewise, the configuration of the apparatus can be altered to allow the execution of the product recipe at a reduced continuous flow rate within the system flow envelope as available.

Because the present invention is designed to blend liquids to mass ratio, and to deliver the correct mass dose of each liquid component even as the density of the liquid changes, it is possible to know the expected density of the final blend liquid. This allows the use of a completely separate and discrete Coriolis mass meter as an independent supervisory device to monitor and assure correct operation of the disclosed blending apparatus. This is particularly important in critical manufacturing environments such as the preparation of pharmaceuticals.

It is well understood that a Coriolis mass meter is an excellent densitometer as well as a flow measuring instrument. Thus, the Coriolis meter is capable of checking a final blend liquid density to very tight tolerance, typically to two or three decimal places.

In practice, the present invention contemplates three preferred means of final density checking.

Figure 8:
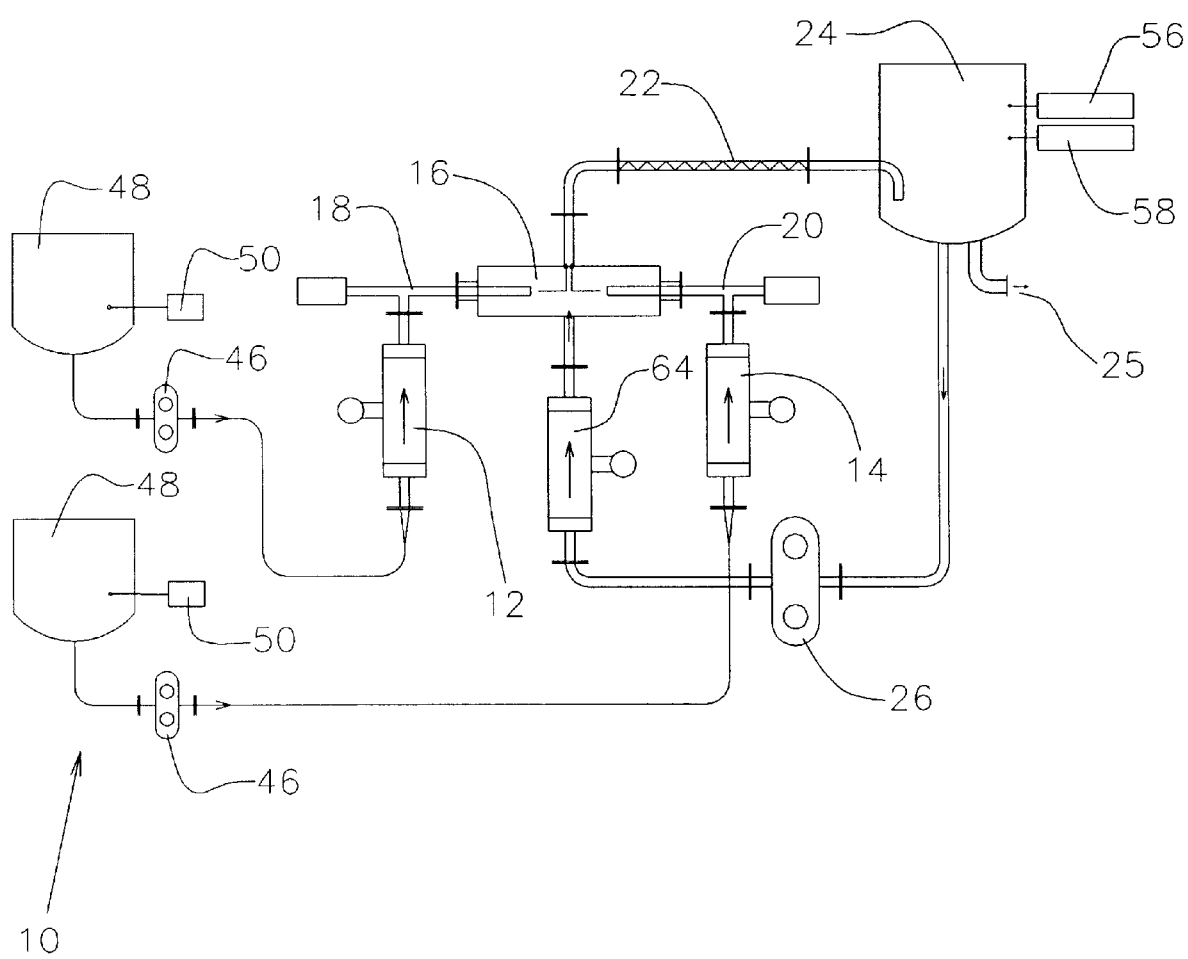
FIG. 8 is a diagrammatic view of a first preferred embodiment of final stream density checking of the continuous liquid steam digital blending system of this invention.

In the first preferred means, a mass meter 64, which is to be used as a densitometer, is installed on the discharge of the mix loop pump as shown in FIG. 8. This method allows continuous sampling and is a means of assessing and assuring that complete mixing of the streams is occurring. This is the case since, typically, incomplete mixing will be detected as density fluctuations by the meter. The density output of the final blend sampling meter is typically provided to the control PLC. The software provides a user adjustable limits alarm, such that the system is inhibited when sample density falls above or below a specified limit, typically set at a fraction of one percent of the target valve. The final blend density target is automatically computed and established as a function of the control and recipe software.

Figure 9:
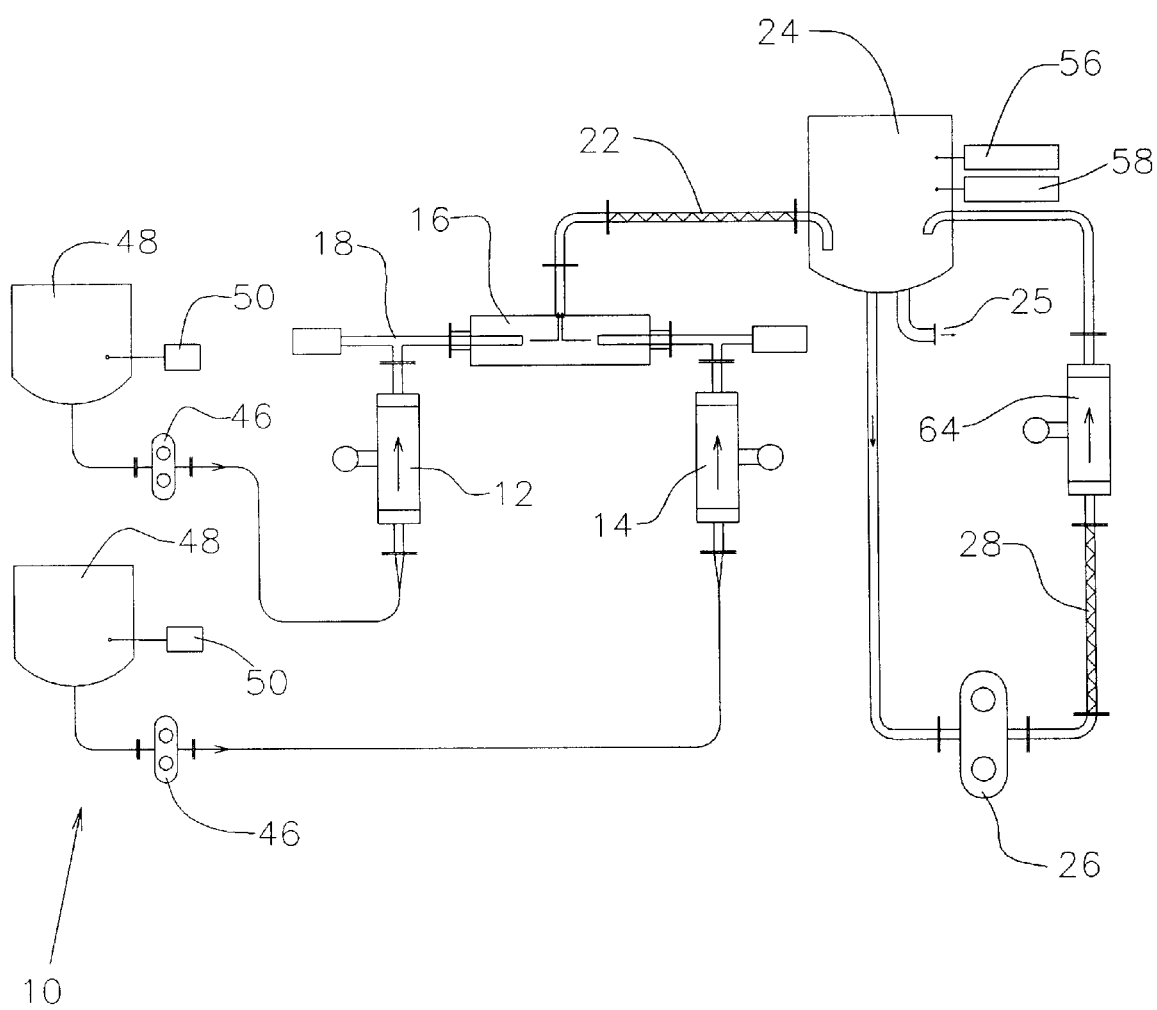
FIGS. 9 and 10 are diagrammatic views of second and third preferred method of final stream density checking, respectively.
Figure 10:
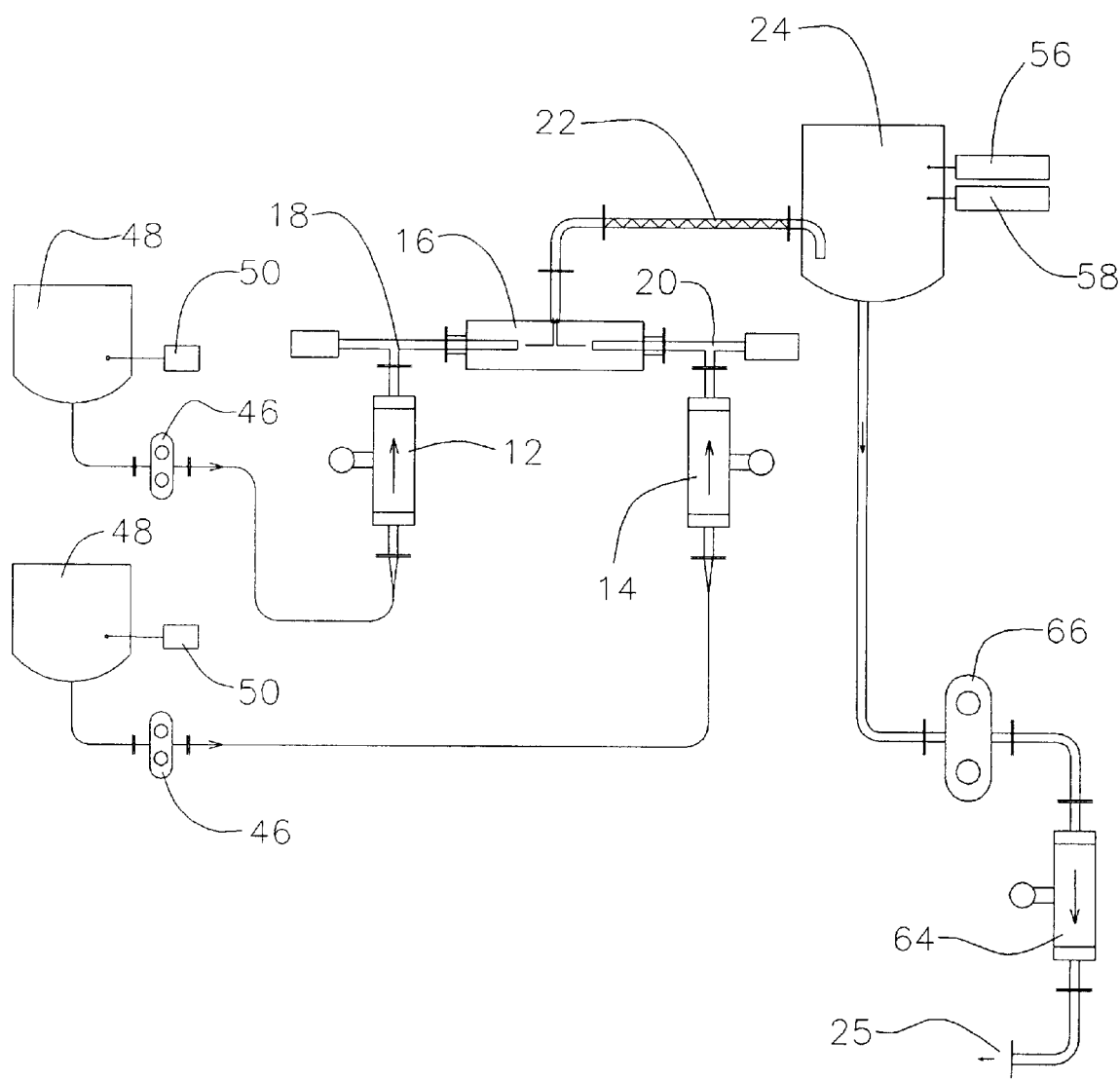

In the second preferred method of final stream density checking, as illustrated in FIG. 9, the density checking mass meter 64 is inserted in the discharge of the mix loop pump of the design shown in FIG. 4, the pump in this instance providing a mixing loop separate from the kinetic mixing chamber. As in the first case, the correctness of mass dose ratio is monitored as is completeness of mixing.

In the third preferred embodiment of final stream density checking, the mass meter 64 is inserted into the discharge of the transfer or continuous feed pump 66 used to remove liquid product from the final blend tank to the point of packaging. As in the first two cases, density is monitored, as well as completeness of mixing.

In all of the three cases for final stream density monitoring it is possible to provide a separate electronic monitoring control such that the density assay is completely divorced and separated from the blending system controls. This is sometimes meritorious as a means of assuring the integrity of a completely independent proofing system. When this is the case, an inhibit signal can still be provided to the blending system.

Figure 11:
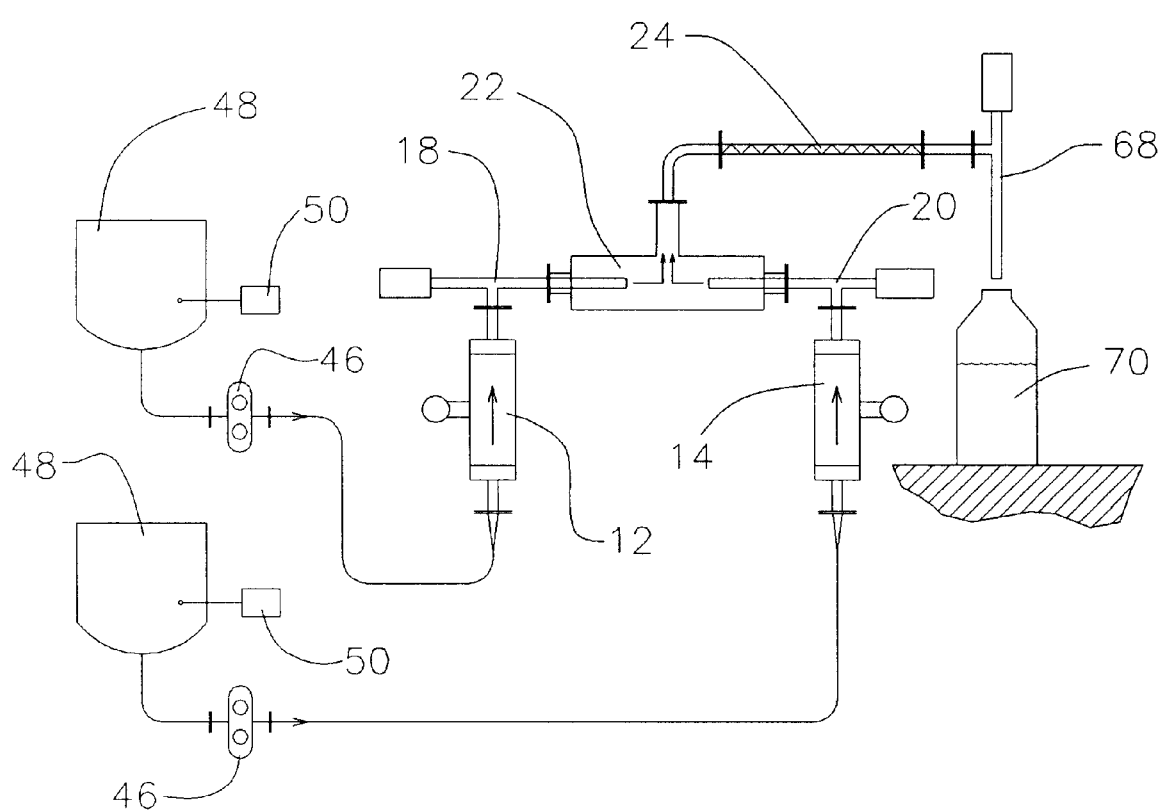
FIG. 11 illustrates how the continuous liquid steam digital blending system of this invention may be used to directly fill a unit of use container.

FIG. 11 illustrates a unique and important capability of the present invention. Because the operation of the blending design is digital, it is possible to configure a continuous liquid stream digital blending system wherein the mass ratio streams are combined in a kinetic mixing chamber, and optimally further mixed by an in-line static mixer, and then directly filled via a positive shut-off filling nozzle 68 into a final blend container in the form of a unit of use container 70. In this design the nozzle 68 is of the same construction as the injectors 18 and 20. This capability can be particularly important in a liquids processing and packaging environment where frequent changes in product species or product colors or fragrances or special ingredients are required. It confers a degree of flexibility and agility of manufacturing not otherwise possible. As illustrated in FIG. 11 the unit of use container is a consumer container in the form of a beverage or juice bottle. It should be obvious that other forms of unit of use containers may be used. For example, the unit of use container may be a consumer container such as a food container, bag, or cup.

While preferred forms of this invention have been described above and shown in the accompanying drawings, it should be understood that applicant does not intend to be limited to the particular details described above and illustrated in the accompanying drawings, but intends to be limited only to the scope of the invention as defined by the following claims.

What is claimed is:

1. Method for continuous liquid stream digital blending comprising the following steps;

providing two or more bulk supply sources of liquid products to be blended, providing a liquid flow meter downstream of each bulk supply source, providing a mixing chamber downstream of the liquid flow meters, providing a dose stream delivery assembly downstream of each liquid bulk supply for delivering small flow doses of liquid product from the associated bulk supply source through the flow meter to the mixing chamber, and providing a final blend container downstream of the mixing chamber;

using the dose stream delivery assemblies to simultaneously deliver small doses of liquid product from each of the two or more bulk supply sources through each respective flow meter and into the mixing chamber, the start of flow and the end of flow of each dose or each dose stream delivery assembly being synchronized with the start and end of flow of all other dose stream assemblies;

using the liquid flow meters to determine the quantity of each dose of liquid being delivered; and repeating the foregoing steps a number of times to create a desired net flow rate of ratio blended liquid products from the mixing chamber into the final blend container.

2. The method for continuous liquid stream digital blending as set forth in claim 1 wherein the final blend container is a tank and further characterized by the additional step of discharging the ratio blended products from the final blend tank in a continuous stream basis.

3. The method for continuous liquid stream digital blending as set forth in claim 2 wherein the discharge from the final blend tank on a continuous stream basis can be altered or varied through on-off modulation, any such modulation having no effect on the dosing method used to produce the blended product, save its on-off status.

4. The method for continuous liquid stream digital blending as set forth in claim 2 wherein the discharge from the final blend tank on a continuous stream basis can be controlled by use of digital or on-off flow rate control, any such control having no effect on the digital dosing method used to produce the blended product save its on-off status.

5. The method for continuous liquid stream digital blending as set forth in claim 2 wherein the discharge from the final blend tank on a continuous stream basis can be varied by any desired analog modulation of flow rate from zero to the maximum of the particular apparatus.

6. The method for continuous liquid stream digital blending as set forth in claim 2 wherein the flow rate of the continuous stream discharged from the final blend tank can be satisfied by simultaneously delivering small doses on an intermittent flow basis to the final blend tank with each intermittent flow being increased by a common factor adequate to produce net flow equal to or greater than the continuous stream take-away requirement.

7. The method for continuous liquid stream digital blending as set forth in claim 2 wherein a Coriolis mass meter may be provided downstream of the final blend tank, and using the Coriolis mass meter to sample the density of the finished liquid stream from the final blend tank to independently check the accuracy with which the final product has been blended.

8. The method for continuous stream digital blending density sampling as set forth in claim 7 wherein a Coriolis mass meter is installed downstream of the final blend tank, and using the Coriolis mass meter for continuous density sampling of the blended liquids as a means of assessing and assuring complete mixing of the streams, incomplete mixing being detected by the meter as excessive density fluctuations.

9. The method for continuous liquid stream digital blending as set forth in claim 2 characterized by the additional steps of discharging the ratio blended products from the mixing chamber to the final blend tank on an intermittent dose basis.

10. The method for continuous liquid stream digital blending as set forth in claim 9 wherein the discharge of the ratio blended product from the final blend tank can be started or stopped at will without any adverse effect upon the accuracy of the blended proportions of the liquid products.

11. The method for continuous liquid stream digital blending as set forth in claim 1 wherein the small doses are delivered in a precise ratio using flow meters, and wherein the small doses from the supply sources can be started at will and stopped at the end of any flow intervals without any adverse effect upon the accuracy of the blended ratio proportions of the liquid products.

12. The method for continuous liquid stream digital blending as set forth in claim 1 wherein each dose stream delivery assembly is a servo driven pump wherein each of the flow meters is a Coriolis mass flow meter through which each of the respective flow doses pass, and further characterized by each the Coriolis mass meter delivering a correct digital flow mass quantity to maintain the correct mass ratio, each flow rate being altered up or down in order to maintain the synchronous flow rates of all streams, such alteration being computed and implemented in the interval between dose cycles by adjustment in the pump servo drive motor velocity setting.

13. The method for continuous liquid stream digital blending as set forth in claim 1 further characterized by monitoring and adjusting if necessary the flow meter dose accuracy and synchrony of flow during each flow cycle.

14. The method for continuous liquid stream digital blending as set forth in claim 1 wherein the flow meters utilized are Coriolis mass flow meters and the mass dose delivered by each dose stream delivery assembly is based directly on a dose mass ratio formula for each liquid component of the finished liquid stream rather than on analog density alteration or analog density adjustment of constituent flow streams or analog density alteration or adjustment of the combined stream.

15. The method for continuous liquid stream digital blending as set forth in claim 1 wherein a positive shut-off dose stream injector is provided downstream of the liquid flow meter and upstream of the mixing chamber, and wherein the small synchronized flow doses are delivered through the positive shut-off injectors into the mixing chamber.

16. The method for continuous liquid stream digital blending as set forth in claim 1 wherein the final blend container is a unit of use container, and wherein a positive shut-off filing nozzle is provided downstream of the mixing chamber, and using said nozzle to fill individual unit of use containers.

17. The method for continuous liquid stream digital blending as set forth in claim 1 wherein the final blend container is a tank, and in which the blended liquid is displaced into a final blend tank and in which the capacity of the final blend tank can be as small as the equivalent of two cycles of simultaneously delivered small doses.

18. The method for continuous liquid stream digital blending as set forth in claim 1 wherein the dose required of each flow channel to achieve the desired flow rate of ratio blended products is determined by the following steps:
  converting volumetric formula of the liquids in the bulk supply sources to a mass formula where mass ratio blending is required;
  then multiplying by a constant to restate a ratio flow rate formula upward to a time adjusted flow adequate to accommodate system functions and cycle time;
  then defining dose channel size required for each component to pre-defined dose channels;
  then restating the flow rate of each dose channel to deliver the correct dose quantity in a defined time, typically 5000 ms, conversion being by multiplication of the flow per minute by the ratio of the defined flow time in seconds divided by 60 seconds;
  then establishing the correct dose quantity for each stream component by entering the dose quantity established in the previous step into the control system electronics with adjustment of dose being automatically computed based on the sample dose liquid quantity;
  then adjusting dose delivery time to the defined flow time for each constituent stream by ratiometrically adjusting the actual measured flow time of each stream to the defined flow time; and
  then adjusting each liquid stream for simultaneous synchronous flow by operating all flow channels with each dose stream flow beginning simultaneously and repeating the previous dose delivery time adjustment step.

19. Apparatus for continuous liquid stream digital blending comprising:
  two or more bulk supply sources of liquid products to be blended;
  a mixing chamber in which two or more simultaneously delivered doses or liquid product are blended the mixing chamber having a discharge;
  a final blend container for receiving the blended liquid products from the discharge of the mixing chamber;
  dose stream delivery assemblies downstream of the bulk supply sources for simultaneously delivering small doses of liquid product from the associated bulk supply sources to the mixing chamber, there being one dose stream delivery assembly for each bulk supply source, the start of flow and the end of flow of each dose for each dose stream delivery assembly being synchronized with the start and end of flow of all other dose stream delivery assemblies to create repeated synchronized flow doses of two or more liquids which are delivered to the mixing chamber, the string of synchronized intermittent dose cycles of the dose stream delivery assemblies creating a desired net flow rate of ratio blended liquids; and
  a flow meter associated with each dose stream delivery assembly and upstream of the mixing chamber, the flow meter being used to determine the quantity of each dose being delivered to the mixing chamber.

20. The apparatus for continuous liquid stream digital blending as set forth in claim 19 further comprising a precision digital clock, each of the delivery assemblies relying upon the clock signal to establish synchronous flow of two or more liquid streams by measurement of digital flow duration against the precision clock signal.

21. The apparatus for continuous liquid stream digital blending as set forth in claim 19 wherein means are provided to adjust the duration of flow between the start of flow of one operating cycle and the start of flow of the next operating cycle.

22. The apparatus for continuous liquid stream digital blending as set forth in claim 19 wherein the flow meter is a Coriolis mass flow meter, the mass flow meter serving only as a mass flow dose totalizer for each small dose of liquid product and not as a flow rate feedback device, and in which the mass flow dose is determined by a variable frequency digital output from the mass flow meter.

23. The apparatus for continuous liquid stream digital blending as set forth in claim 19 further characterized by the provision of at least one ribbon type in-line static mixing device downstream of the mixing chamber.

24. The apparatus for continuous liquid stream digital blending as set forth in claim 19 wherein each of the dose stream delivery assemblies includes a positive shut-off dose stream injector connected downstream of each flow meter, and wherein the dose stream delivery assembly initiates liquid flow from the bulk supply through the positive shut-off dose stream injector to simultaneously deliver relatively small synchronized flow doses of liquid product to the mixing chamber.

25. The apparatus for continuous liquid stream digital blending as set forth in claim 24 in which the positive dose stream injectors are mounted on the mixing chamber is such a manner that the primary mixing of the synchronized flow doses of liquid product occurs in the mixing chamber, flow doses from one of the positive shut-off dose stream injectors being directed to collide with the flow doses from the other positive shut-off dose stream injectors.

26. The apparatus for continuous liquid stream digital blending as set forth in claim 25 wherein each of the positive shut-off dose stream injectors is located adjacent to a point of common dosing of the synchronously flowing liquid streams to assure high precision, accuracy and repeatability of mass dose, and prevents any back flow or mixing of other liquid constituents into the individual dose streams.

27. The apparatus for continuous liquid stream digital blending as set forth in claim 24 wherein each dose stream delivery assembly consists of a servo drive motor and associated controller, and a rotary pump.

28. The apparatus for continuous liquid stream digital blending as set forth in claim 27 further characterized by the provision of a servo drive motor mounted digital encoder, and wherein the rate at which each dose flows through the flow meter and is delivered from each positive shut-off dose stream injector is regulated to prevent variance during the period of dosing by digital encoder feedback signal connected directly to the controller associated with the servo drive motor.

29. The apparatus for continuous liquid stream digital blending as set forth in claim 24 wherein the dose stream delivery assembly is a positive displacement pump.

30. The apparatus for continuous liquid stream digital blending as set forth in claim 29 wherein each of the positive displacement pumps is located downstream of an associated bulk supply source and upstream of an associated flow meter.

31. The apparatus for continuous liquid stream digital blending as set forth in claim 24 in which the dose stream delivery assembly associated with each bulk supply source establishes a fixed and constant pressure head at the bulk supply sources, the pressure head delivering liquid product through the respective flow meters to the associated dose stream injectors and thereby into the mixing chamber.

32. The apparatus for continuous liquid stream digital blending as set forth in claim 31, wherein the dose stream delivery assembly includes a constant level reservoir for establishing a fixed and constant pressure head.

33. The apparatus for continuous liquid stream digital blending as set forth in claim 31, wherein the dose stream delivery assembly includes a constant pressure reservoir for establishing a fixed and constant pressure head.

34. The apparatus for liquid stream digital blending as set forth in claim 24 in which a separate positive shut-off dose stream nozzle is mounted downstream of each dose stream delivery assembly and upstream of the mixing chamber in order to permit actual dose sampling capability on each flow stream, thus allowing direct empirical calibration and verification of each flow meter dose ratio.

35. The apparatus for continuous liquid stream digital blending as set forth in claim 19 wherein two or more ribbon type in-line static mixing devices are provided downstream of the mixing chamber, the ribbon type in-line mixing devices being parallel to each other to reduce system back pressure.

36. The apparatus for continuous liquid stream digital blending as set forth in claim 19 wherein each flow meter is a volumetric flow meter, the volumetric flow meter serving only as a volumetric flow totalizer and not as a flow rate feedback device and in which the volumetric flow total is determined by a variable frequency digital output from the volumetric flow meter.

37. The apparatus for liquid stream digital blending as set forth in claim 19 wherein the mixing chamber is a kinetic mixing chamber, the synchronized flow doses being combined in the kinetic mixing chamber.

38. The apparatus for continuous stream digital blending as set forth in claim 19 in which parallel flow meters and dose stream delivery assemblies may be provided for one or more liquid products, thus permitting higher total flow rates of the final blended stream without the use of larger flow pathway components.

39. The apparatus for continuous liquid stream digital blending as set forth in claim 19 in which each unit dosing stream apparatus consisting of a bulk supply source, a flow meter, and a dose stream delivery assembly is modular, and wherein a series of units are provided, with overlapping flow capabilities, to provide a range of mass ratio capabilities suitable for use with a broad range of liquids products formulas.

40. The apparatus for continuous liquid stream digital blending as set forth in claim 19 in which the final blend container is a separate and discrete tank.

41. The apparatus for continuous liquid stream digital blending as set forth in claim 40 in which digital flow into the final blend tank is started and stopped by a suitable liquid level control associated with the final blend tank such that blended product is always available from the tank on a continuous flow stream basis up to a specified maximum outflow rate; and in which adequate final blend tank capacity is available to allow completion of an entire summed digital dose from the mixing apparatus above the maximum tank liquid level established by the liquid level control; and in which continuous stream final blend tank capacity can be as small as two summed and blended digital doses; and in which the final blend tank can be enlarged as desired in order to increase final blended product capacity and thus extend depletion time as may be required.

42. The apparatus for continuous liquid stream digital blending as set forth in claim 19 wherein the dose stream delivery assembly includes a controller for synchronizing the small flow doses, wherein there is an off time between the delivery time of the small flow doses which are delivered to the mixing chamber, and wherein the controller automatically adapts to changes in the continuous stream take-away flow rate from the final blend container by varying the off time interval between synchronous doses, thus eliminating adjustment or re-calibration of the flow streams as a function of varying take away demand.

43. The apparatus for continuous liquid stream digital blending as set forth in claim 19 wherein the final blend container is a discrete and separate unit of use container, the synchronized and mixed doses being filled directly into the unit of use container downstream of the mixing chamber.

44. The apparatus for liquid stream digital blending as set forth in claim 43 in which the unit of use container is a consumer container such as a bottle.

45. Apparatus for continuous liquid stream digital blending comprising:

two or more bulk supply sources of liquid products to be blended;

a mixing chamber downstream of each bulk supply, the mixing chamber having a discharge;

a positive shut-off dose stream injector connected to the mixing chamber;

a final blend container connected to the discharge of the mixing chamber; and a dose stream delivery assembly downstream of each liquid bulk supply for delivering small flow doses of liquid product from the associated bulk supply source to the mixing chamber, each of the delivery assemblies including a servo motor controlled rotary positive displacement pump directly delivering doses of liquid to the positive shut-off injector nozzle and into the mixing chamber, each dose being derived by the incremental rotation of the rotary positive displacement pump as measured and controlled by a rotary encoder associated with each servo motor, the dose stream delivery assemblies for the two or more bulk supply sources being synchronized to create repeated synchronized flow doses of two or more liquids to the mixing chamber, the string of synchronized intermittent dose cycles creating a desired net flow rate of ratio blended liquids.

* * * * *